(12) United States Patent
Chhibber et al.

(10) Patent No.: US 11,245,618 B2
(45) Date of Patent: Feb. 8, 2022

(54) MULTICAST TRACEROUTE FACILITY WITH BATCH QUERY PROCESSING FOR MULTIPLE FLOWS AND RESERVATION OF RESOURCES FOR REQUESTED LINK METRICS

(71) Applicant: Cisco Technology, Inc., San Jose, CA (US)

(72) Inventors: Rishi Chhibber, Dublin, CA (US); Roshan Lal, San Jose, CA (US); Rahul Savarapu Parameswaran, Union City, CA (US); Subhasri Dhesikan, Flower Mound, TX (US); Mankamana Prasad Mishra, Dublin, CA (US); Stig Ingvar Venaas, Oakland, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 279 days.

(21) Appl. No.: 16/392,974

(22) Filed: Apr. 24, 2019

(65) Prior Publication Data
US 2020/0344155 A1    Oct. 29, 2020

(51) Int. Cl.
*G06F 15/173*    (2006.01)
*H04L 12/721*    (2013.01)
(Continued)

(52) U.S. Cl.
CPC .............. *H04L 45/34* (2013.01); *H04L 45/16* (2013.01); *H04L 45/20* (2013.01); *H04L 45/74* (2013.01); *H04L 47/15* (2013.01); *H04L 47/72* (2013.01)

(58) Field of Classification Search
CPC ......... H04L 45/34; H04L 45/16; H04L 45/20; H04L 45/74; H04L 47/15; H04L 47/72
(Continued)

(56) References Cited

U.S. PATENT DOCUMENTS

2003/0187986 A1*  10/2003  Sundqvist ............... H04L 45/00
                                                                709/225
2008/0080507 A1    4/2008  Swallow et al.
(Continued)

OTHER PUBLICATIONS

W. Fenner et al., "A "traceroute" facility for IP Multicast.", Internet Engineering Task Force Inter-Domain Multicast Routing Working Group, Internet-Draft, draft-ietf-idmr-traceroute-ipm-05.txt, Jun. 25, 1999, 22 pages.
(Continued)

*Primary Examiner* — Duyen M Doan
(74) *Attorney, Agent, or Firm* — Edell, Shapiro & Finan, LLC

(57) ABSTRACT

In one illustrative example, a multicast traceroute facility for a plurality of interconnected router nodes which are configured to communicate IP multicast traffic amongst hosts is described. The multicast traceroute facility may be for use in processing a multicast traceroute batch query packet which indicates a batch of multicast traceroute queries of a batch query, for identifying a plurality of traced paths for a batch of IP multicast traffic flows. Each identified traced path may be associated with one or more links, each of which has a link metric that satisfies a requested link metric (e.g. a link bandwidth). Resources for satisfying the requested link metric may be reserved for a predetermined or specified time period. The batch of IP multicast traffic flows may be established via at least some of the interconnected router nodes according to the plurality of traced paths identified from the query packet processing.

20 Claims, 30 Drawing Sheets

(51) Int. Cl.
*H04L 12/761* (2013.01)
*H04L 12/733* (2013.01)
*H04L 12/911* (2013.01)
*H04L 12/741* (2013.01)
*H04L 12/801* (2013.01)

(58) Field of Classification Search
USPC .................................................. 709/223–225
See application file for complete search history.

(56) References Cited

U.S. PATENT DOCUMENTS

| | | |
|---|---|---|
| 2008/0151764 A1 | 6/2008 | Wing et al. |
| 2009/0135728 A1 | 5/2009 | Shen et al. |
| 2009/0198832 A1 | 8/2009 | Shah et al. |
| 2010/0103822 A1 | 4/2010 | Montwill |
| 2012/0033667 A1* | 2/2012 | Venkataraman ........ H04L 45/16 |
| | | 370/390 |
| 2012/0113817 A1 | 5/2012 | Fitzgerald et al. |
| 2012/0120954 A1* | 5/2012 | Mentze ................ H04L 43/10 |
| | | 370/390 |
| 2015/0036478 A1 | 2/2015 | Shah et al. |
| 2016/0112481 A1 | 4/2016 | Pani et al. |
| 2018/0062930 A1 | 3/2018 | Dhesikan et al. |

OTHER PUBLICATIONS

H. Asaeda et al., "Mtrace Version 2: Traceroute Facility for IP Multicast", MBONED Working Group, Internet-Draft, Intended status: Standards Track, draft-ietf-mboned-mtrace-v2-20, Oct. 14, 2017, 36 pages.

H. Asaeda et al., "Mtrace Version 2: Traceroute Facility for IP Multicast", Internet Engineering Task Force (IETF), Request for Comments: 8487, Category: Standards Track, ISSN: 2070-1721, Oct. 2018, 41 pages.

Stephanie Chan, "Cisco Pioneer Awards celebrates 20th anniversary with 2018 winners," Cisco, The Network, Nov. 1, 2018, 12 pages.

Cisco, "Cisco Nexus 9000 Series NX-OS IP Fabric for Media Solution Guide, Releases 7.0(3)I4(5), 7.0(3)F2(1), and Later 7.x Releases," Dec. 22, 2016, 84 pages.

* cited by examiner

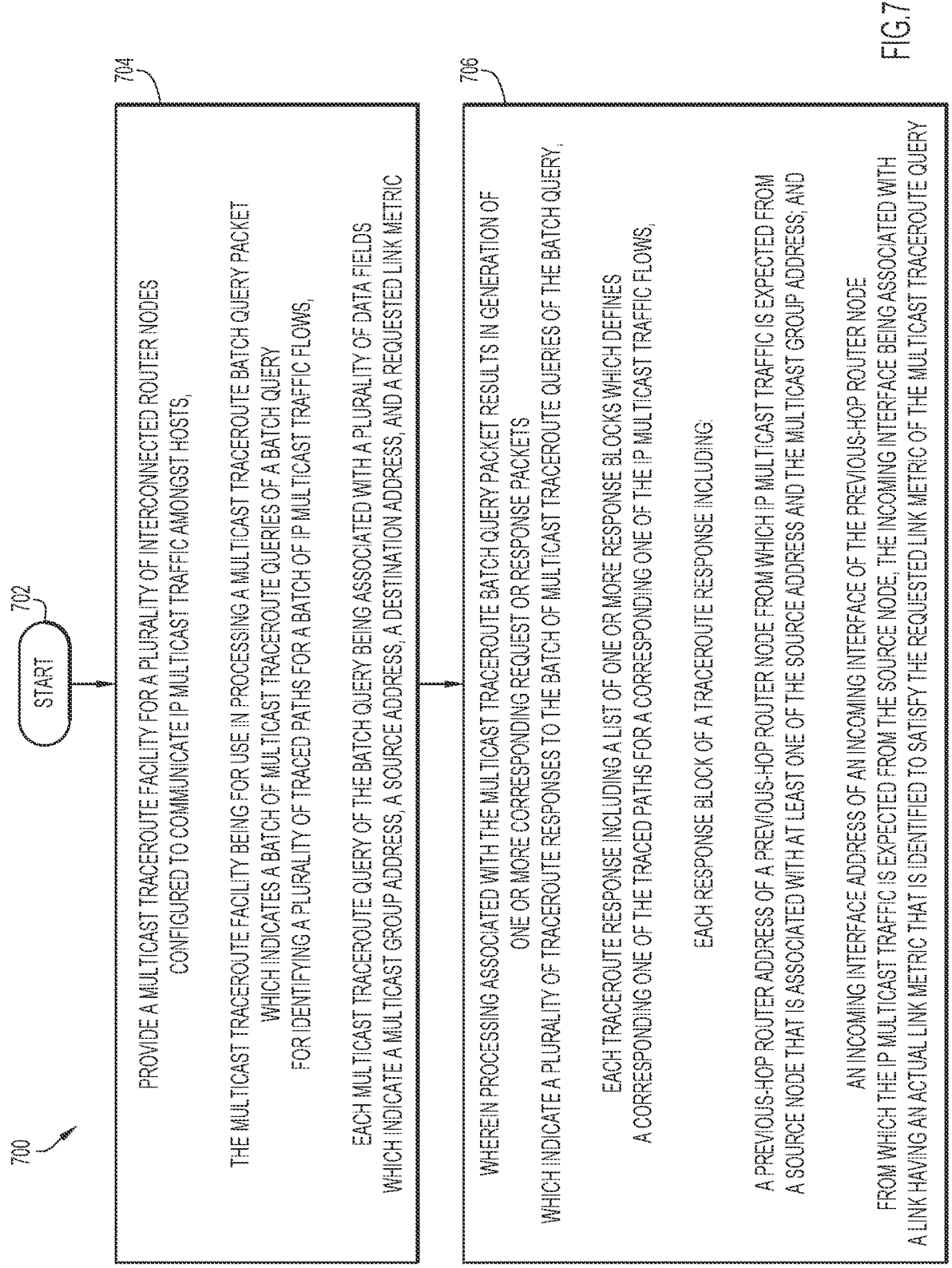

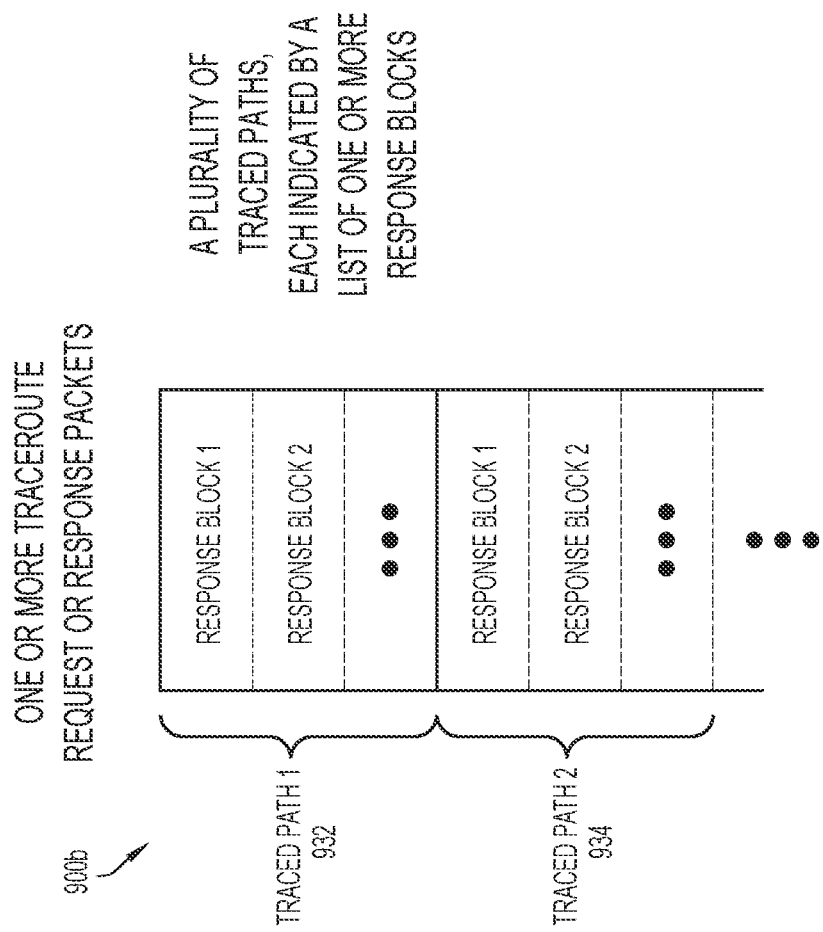

EXAMPLE OF RESPONSE BLOCK
(DATA SEGMENT)

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |

900c

| QUERY ARRIVAL TIME |
|---|
| INCOMING INTERFACE ADDRESS |
| OUTGOING INTERFACE ADDRESS |
| PREVIOUS-HOP ROUTER ADDRESS |
| INPUT PACKET COUNT ON INCOMING INTERFACE |
| OUTPUT PACKET COUNT ON OUTGOING INTERFACE |
| TOTAL NUMBER OF PACKETS FOR THIS SOURCE GROUP PAIR |

| RTG PROTOCOL | FWSTTL | M B S N Z | SRC MASK | FORWARDING CODE |

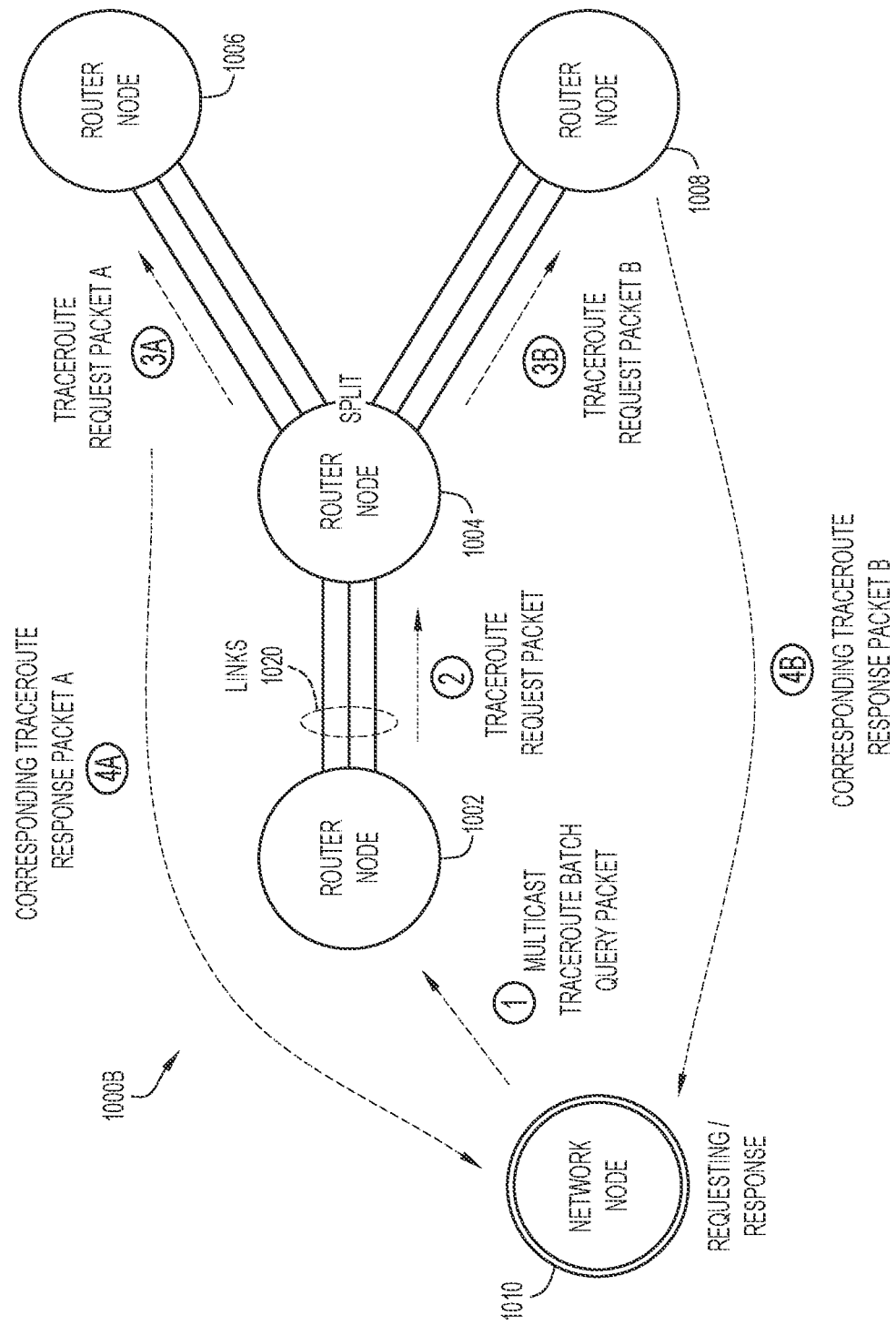

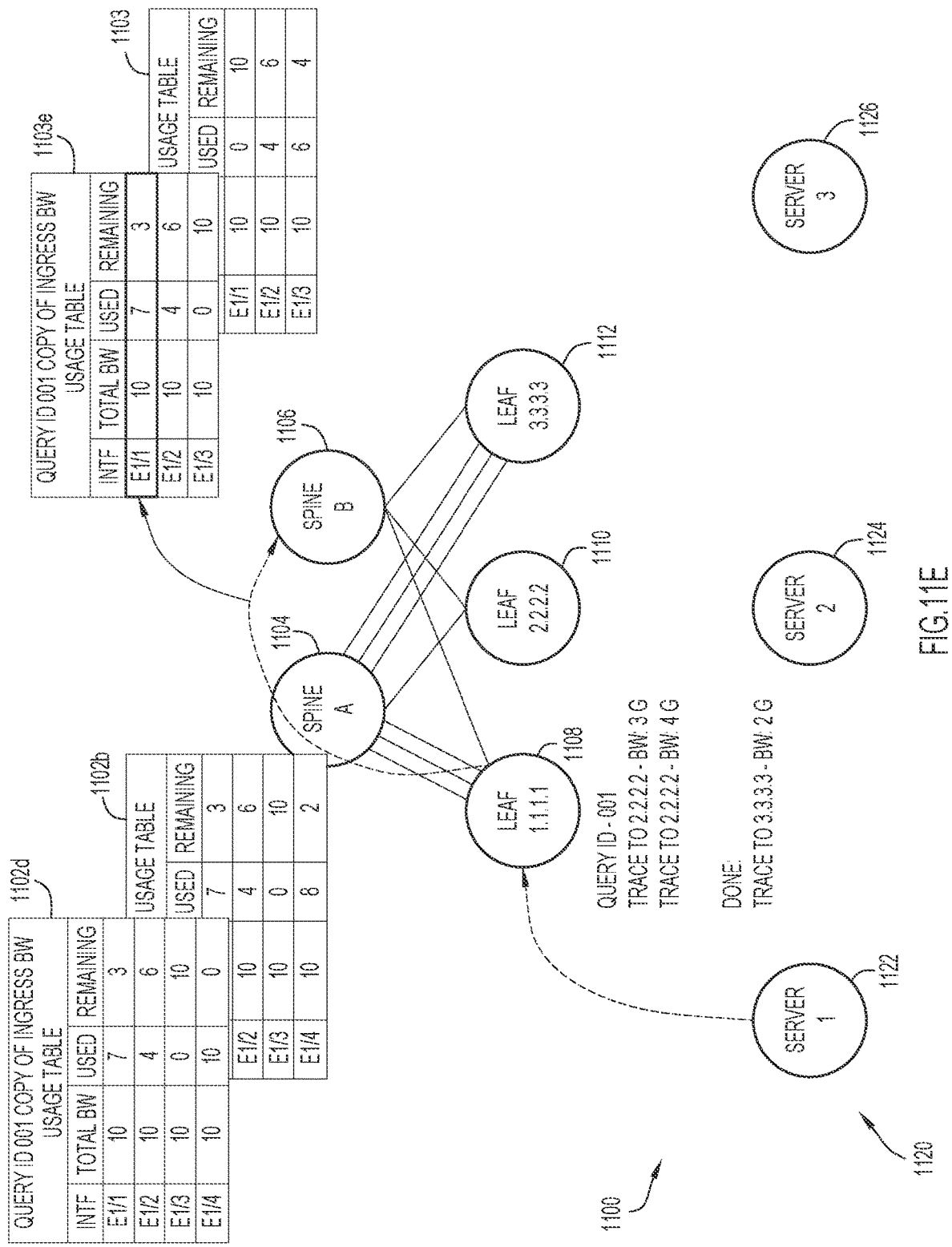

MULTICAST TRACEROUTE FACILITY WITH BATCH QUERY PROCESSING FOR MULTIPLE FLOWS AND RESERVATION OF RESOURCES FOR REQUESTED LINK METRICS

TECHNICAL FIELD

The present disclosure relates to a multicast traceroute facility for use with a plurality of interconnected router nodes which are configured to facilitate communication of IP multicast traffic amongst hosts, and more particularly to a multicast traceroute facility for batch query processing for multiple flows and reservation of resources for requested link metrics.

BACKGROUND

A network fabric may include a plurality of interconnected router nodes which are configured to facilitate communication of IP multicast traffic amongst hosts. In such a network fabric, a multicast traceroute facility may be used for tracing a route that a multicast IP packet may take from a source to a particular receiver. However, existing multicast traceroute facilities do not provide adequate capabilities for some environments and industries.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6, 7, and 8A-8B are flowcharts for describing methods of a multicast traceroute facility for batch query processing for multiple flows and requested link metrics according to some implementations of the present disclosure;

FIG. 9B is an illustrative example of a data grouping of one or more traceroute request or response packets which indicate a plurality of traced paths associated with a batch of IP multicast traffic flows, where each traced path is indicated in a list of one or more response blocks;

FIG. 9C is an illustrative example of a message format of a response block in the data grouping in FIG. 9B, where each response block may indicate a previous-hop router node and an incoming interface of the previous-hop router node, where the incoming interface is associated with a link having a link metric that is identified to satisfy the requested link metric;

FIGS. 10A, 10B, and 10C are basic process flow diagrams for describing batch query processing for multiple flows and requested link metrics according to some implementations of the present disclosure;

FIGS. 11A through 11L are process flow diagrams involving node arrangements for describing a multicast traceroute facility for batch query processing for multiple flows and requested link metrics according to some implementations of the present disclosure.

DESCRIPTION OF EXAMPLE EMBODIMENTS

Figure 1:
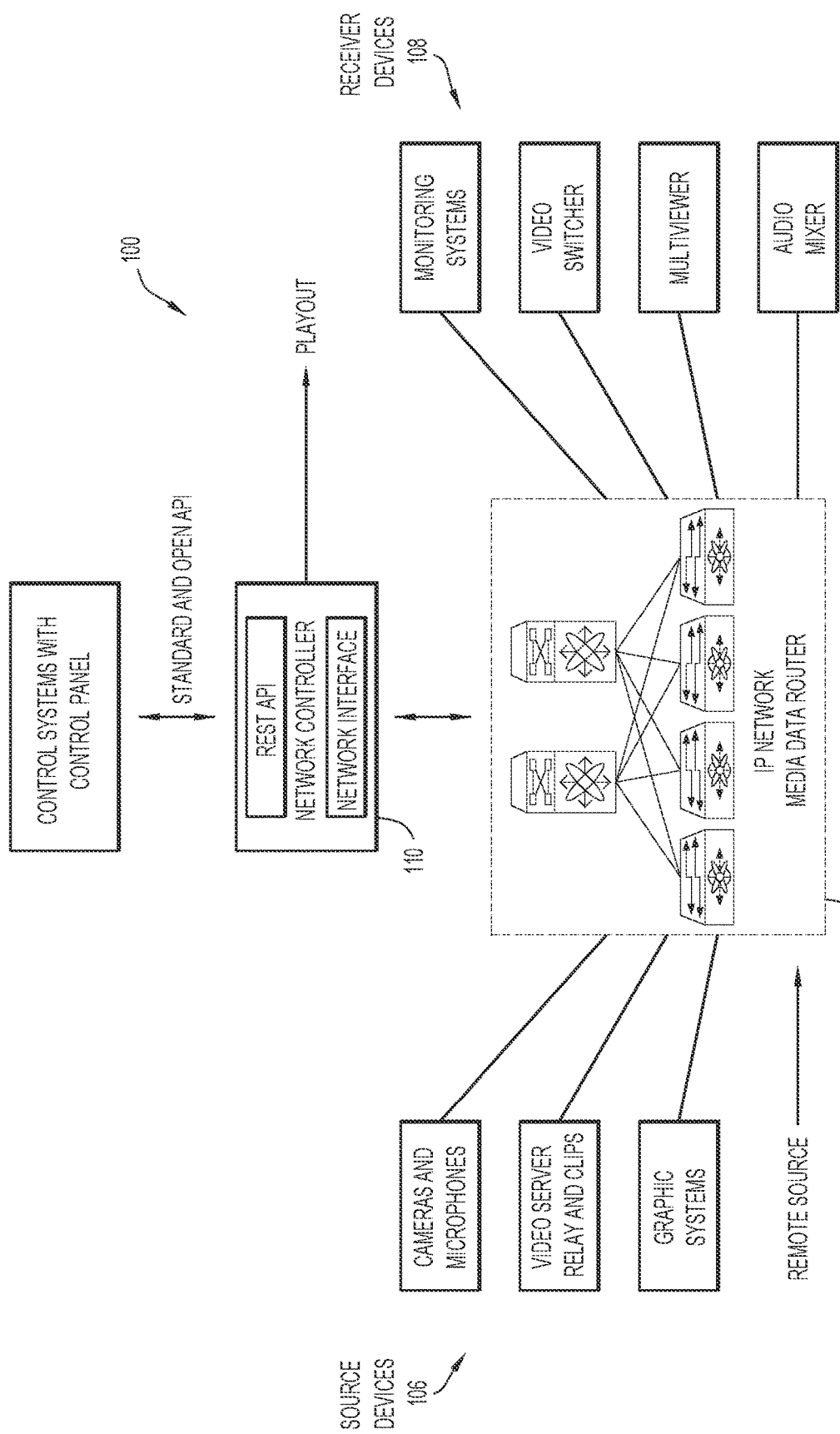
FIG. 1 is an illustrative representation of a system for use in delivering IP multicast media data with use of an IP network media data router, which is an example product within which at least some implementations of the present disclosure may be realized.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

A multicast traceroute facility with batch query processing for multiple flows and/or reservation of resources for requested link metrics is described herein.

In one illustrative example, the multicast traceroute facility is for use with a plurality of interconnected router nodes (e.g. routers or switches of a switched-network fabric) which are configured to communicate IP multicast traffic amongst hosts. The multicast traceroute facility may be used for processing a multicast traceroute batch query packet which indicates a batch of multicast traceroute queries of a batch query, for identifying a plurality of traced paths for a batch of IP multicast traffic flows.

Each traced path may be associated with one or more links each having a link metric that is identified to satisfy a requested link metric. In some implementations, the requested link metric may be a requested link bandwidth. In some further implementations, resources for satisfying the requested link metric for each link of each traced path may be reserved for at least a predetermined or specified time period.

After such processing, the batch of IP multicast traffic flows may be established via at least some of the interconnected router nodes according to the plurality of traced paths identified from the processing of the multicast traceroute batch query packet of the batch query.

More detailed and alternative techniques and implementations are provided herein as described below.

Example Embodiments

IP multicast is a bandwidth-conserving technique that reduces traffic by simultaneously delivering a single stream of information to many (e.g. potentially thousands of) recipients. Applications that take advantage of multicast include video conferencing, corporate communications, distance learning, and distribution of software, stock quotes, and news, amongst many others. IP multicast delivers application source traffic to multiple host receiver devices without burdening the source or the host receiver devices, using a minimum amount of network bandwidth. Multicast packets are replicated in the network at the point where paths diverge by multicast-configured router nodes, resulting in an efficient delivery of data to multiple host receiver devices.

Many alternatives to IP multicast require the source to send more than one copy of the data. Some alternatives, such as application-level multicast, require the source to send an individual copy to each host receiver device. High-bandwidth applications, such as Motion Picture Experts Group (MPEG) video, may require a large portion of the available network bandwidth for a single stream. In these applications, IP multicast may be the (e.g. only) satisfactory way to send to more than one host receiver devices simultaneously. Even low-bandwidth applications can benefit from IP multicast, for example, when there are thousands of host receiver devices.

Multicast is based on the concept of a group. A multicast group may be an arbitrary group of host receiver devices that expresses an interest in receiving a particular data stream. This group has no physical or geographical boundaries; the host receiver devices may be located anywhere on the Internet or any private internetwork.

IP multicasting may rely on a group management protocol to establish and maintain local multicast group membership, as well as multicast routing protocols to route packets efficiently. For example, an Internet Group Management Protocol (IGMP) may be used to manage packet communication between host receiver devices and their local multicast router node, allowing the hosts join or leave groups. Examples of multicast protocols include Protocol Independent Multicast (PIM) Sparse Mode (PIM-SM) and PIM source specific multicast (PIM-SSM) routing protocols. These protocols are known and described in detail in *Protocol Independent Multicast-Sparse Mode (PIM-SM): Protocol Specification (Revised)*, Request for Comments (RFC) 4601, B. Fenner et al., August 2006; and *Internet Group Management Protocol, Version* 3, RFC 3376, Cain et al., October 2002. Each of the above documents is hereby incorporated by reference as though fully set forth herein.

In a typical scenario, host receiver devices of a designated multicast group may be interested in receiving a video data stream from a particular source. A host receiver device may indicate its interest by sending an IGMP host report to router nodes in the network. The host receiver device may also use IGMP to send a group membership message to its directly-connected ("last-hop") router, indicating that the host wants to join a particular group. The router nodes may use PIM to dynamically create a distribution tree, and deliver the video data from the source to the host receiver devices along the distribution tree. The video data stream will be delivered along network segments of the distribution tree between the source and the host receiver devices.

Multicast packets may be identified by a multicast group address in the destination address field of an IP header. Again, multicast routing protocols are used to construct the distribution trees through the network and direct multicast forwarding, defining the path that the multicast traffic will take through the network to its group members. The distribution trees may be source or shared distribution trees. A distribution tree is shared when any source originating data traffic destined to a group address of a multicast group uses the same distribution tree to forward data to the host receiver devices. On the other hand, a source distribution tree is a separate, shortest path tree (SPT) built for each source originating traffic to a multicast group.

Shortest path trees allow for the creation of an optimal path between the source and the host receiver devices. In at least many or most instances, this provides for a minimum amount of network latency in the forwarding multicast traffic. Here, the router nodes in the tree have to maintain path information for each source in a multicast routing table. On the other hand, shared trees allow for a minimum or reduced amount of state to be maintained in each router node. This lowers the overall memory requirements in a network that allows for only shared trees. In shared trees, the paths between the source and the host receiver device may not always be optimal paths. This may introduce some latency in packet delivery.

A special notation of "(S, G)" may enumerate an SPT where S is the IP address of the source and G is the multicast group address. The (S, G) notation implies that a separate SPT may exist for each individual source sending to each group. Unlike source trees that have their root at the source, shared trees use a single common root placed at some chosen point in the network (e.g. a rendezvous point). When using a shared tree, sources send their traffic to the root and then the traffic is forwarded down the shared tree to reach the host receiver devices. Since all sources in the multicast group use a common shared tree, a wildcard notation written as (*, G) may represent the tree. In this case, "*" means all sources and "G" represents the multicast group. Typically, both SPTs and shared trees are loop-free. Messages are replicated only where the tree branches.

At least in some configurations, IP multicast may be deployed on a computer network using a specific rendezvous point. This may be done in order to build a shared multicast distribution tree for a multicast group falling within a destination address prefix, or to build a separate shortest path tree for each source originating traffic to the multicast group. A rendezvous point may be considered to be a specific router node that is designated as the root of a shared multicast distribution tree.

A router node may join a multicast group (distribution tree) towards the source or rendezvous point. The interface on the router node leading towards the source or rendezvous point may be referred to as an ingress interface. Depending upon the multicast routing protocol, there is usually only one ingress interface on the router node receiving multicast packets for a particular route. One or more interfaces on the router node leading towards the host receiver devices may be referred to as egress interfaces. The host receiver devices are leaves on the distribution tree. Packets are sent from a source to the root (source or rendezvous point) of the distribution tree, where they are forwarded towards the branches and out to the nodes that represent the host receiver devices. On each node, packets are received on the ingress interface towards the root of the tree and packets are forwarded out egress interfaces towards the host receiver devices.

In such multicast environments, a multicast traceroute facility may be used for "tracing" a route that a multicast IP packet may take from a source to a particular receiver. However, existing multicast traceroute facilities do not provide adequate capabilities for some environments and industries.

In the media and broadcasting industry, for example, a broadcast production environment that traditionally leverages a Serial Digital Interface (SDI) infrastructure has been moving to an IP infrastructure. Unfortunately, existing multicast traceroute facilities do not provide adequate capabilities in the broadcast production environment that leverages the IP infrastructure.

To better illustrate in relation to an example environment, FIG. 1 is an illustration of a system 100 for use in IP multicast delivery of media data using an IP network media data router 102. Video and/or audio signals may be communicated in system 100 with use of IP network media data router 102. As shown, a plurality of source devices 106 may connect to IP network media data router 102 to send media signals. Source devices 106 may include cameras and microphones, video server relay and clips, graphic systems, remote sources, television broadcast sources, and/or any other suitable source devices. A plurality of receiver devices 108 may connect to IP network media data router 102 to receive media signals from any one of the sources devices 106. As illustrated, receiver devices 108 may include monitoring systems, video switches, multi-viewers, audio mixers, and/or any other suitable receiver devices.

Again, IP network media data router 102 may be operative to provide IP multicast delivery of media data from source devices 106 to receiver devices 108. The source devices 106 may connect to IP network media data router 102 to send media data (e.g. video and/or audio data) via IP multicast delivery, and the receiver devices 108 may connect to IP network media data router 102 to receive the media data via IP multicast delivery from selected ones of sources devices 106. A network controller 110 may also be provided to interface with IP network media data router 102 via a network interface, for control by one or more control systems via an application programming interface (API) (e.g. a REST API).

In some preferred implementations, the IP network media data router 102 may be configured to provide for an IP multicast delivery of media data at a guaranteed (non-blocking) bandwidth, such as for video for live studio broadcast production. The system 100 of FIG. 1 may be referred to as an IP Fabric for Media solution.

Figure 2A:
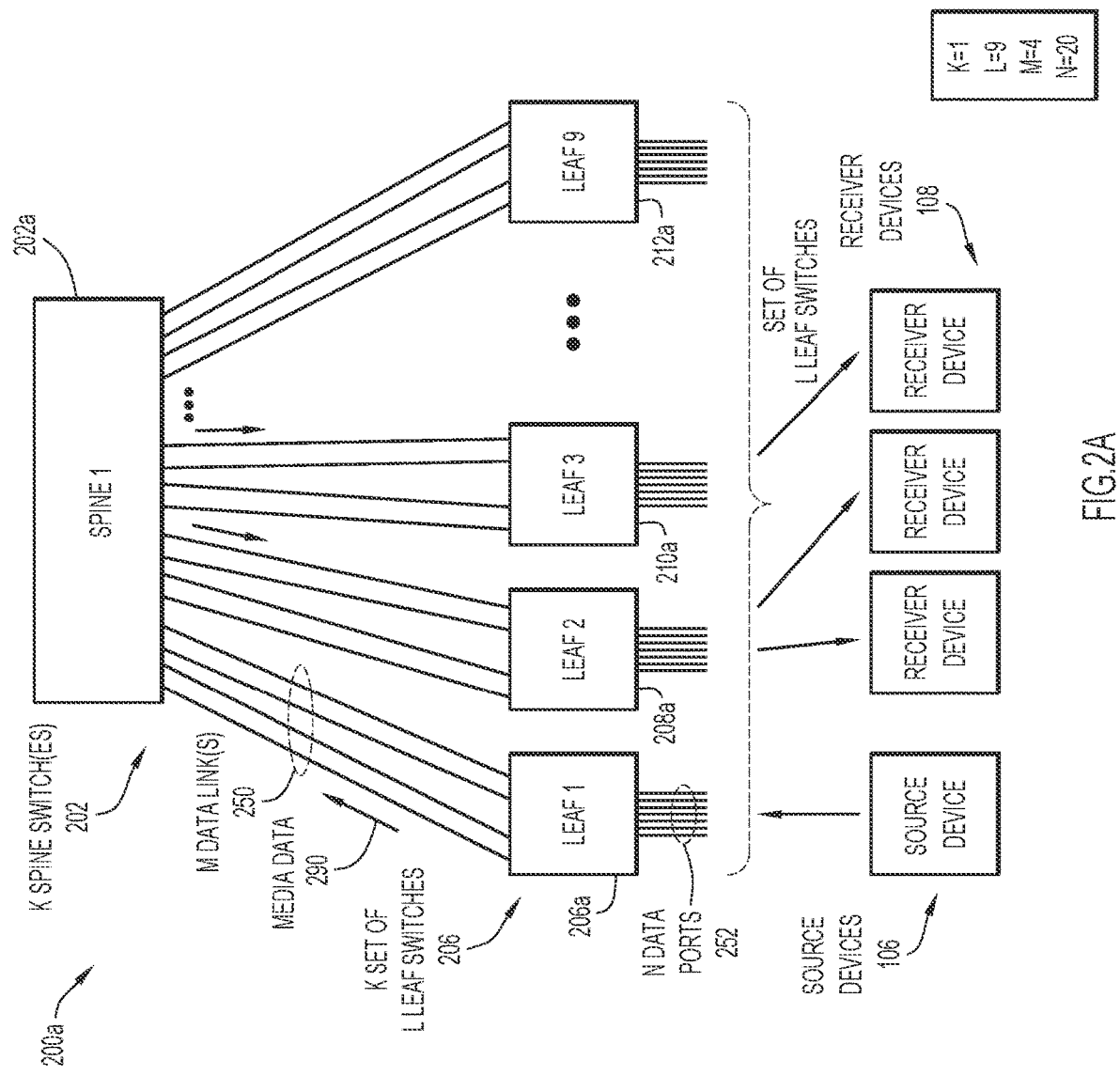
FIG. 2A is an illustration of an example of a spine and leaf switch architecture of the IP network media data router of FIG. 1, which is an example architecture within which at least some implementations of the present disclosure may be realized.

FIG. 2A is an illustration of one example of a spine and leaf switch architecture 200a which may be used in the IP network media data router 102 of FIG. 1. Spine and leaf switch architecture 200a of IP network media data router 102 of FIG. 2A is operative to provide IP multicast delivery of media data from source devices 106 to receiver devices 108. To provide IP multicast delivery, spine and leaf switch architecture 200a may operate with use of one or more multicast protocols, such as Internet Group Management Protocol (IGMP), Protocol Independent Multicast (PIM), and/or other suitable protocols.

Although a spine and leaf architecture is shown and described in the present disclosure, it is noted that such topology is used to provide merely an illustrative example topology within which techniques of the present disclosure may be utilized. Thus, implementations of the present disclosure may be applied to a network fabric having a plurality of router nodes connected in any suitable topology configuration, such as a single box topology, a mesh topology, a ring topology, etc.

As illustrated in FIG. 2A, spine and leaf switch architecture 200a may include K spine switches 202 (e.g. spine switch 402a), K sets of L leaf switches 206 (e.g. leaf switches 206a, 208a, 210a, through 212a for a total of 9 leaf switches), M data links 250 between each leaf switch and each spine switch, and a plurality of bidirectional data ports 252 (i.e. for source and receiver connections) connected to each leaf switch. Each one of data links 250 may be provided or set with a maximum link bandwidth of $BW_L$. Source devices 106 and receiver devices 108 may connect to any of the bidirectional data ports 252 for the communication of media data. Although data ports 252 are bidirectional, their use in practice is highly asymmetrical (i.e. one-way, depending on whether the connected device is a source or a receiver). In actual practice, the number of receiver devices 108 connected to bidirectional data ports 252 may far exceed the number of source devices 106 connected to bidirectional data ports 252.

To illustrate the basic approach in FIG. 2A, one of source devices 106 may send media data through one of bidirectional data ports 252 of leaf switch 206a. An IP multicast of the media data (e.g. media data 290) may be sent from leaf switch 206a up to spine switch 202a, and then down to leaf switches 208a and 210a. Two of the receiver devices 108 may receive the media data via leaf switch 208a as shown, and another one of the receiver devices 108 may receive the media data via leaf switch 210a as shown.

In some implementations, the IP network media data router 102 may be provided and/or specified with a maximum number of the bidirectional data ports 252

$$N=(a/K) \times (BW_L/BW_P)$$

for a non-blocking IP multicast delivery of data at a maximum port bandwidth of $BW_P$, where a is a fixed constant greater than or equal to K. More specifically, the non-blocking of IP multicast delivery may be a guaranteed non-blocking IP multicast delivery. In some implementations, the IP network media data router 102 may have (e.g. exactly) N bidirectional data ports connected to each leaf switch as specified above. More generally, the number of bidirectional data ports provided for use in the IP network media data router 102 may be $N \leq (a/K) \times (BW_L/BW_P)$ for guaranteed non-blocking IP multicast delivery.

When the property or constraint of $N \leq (a/K) \times (BW_L/BW_P)$ is satisfied (i.e. the non-blocking feature is in effect), any or most any traffic flow pattern using source and receiver devices 106 and 108 connected to bidirectional data ports 252 may be achieved. When the property or constraint is violated (i.e. $N > (a/K) \times (BW_L/BW_P)$), the non-blocking aspect may not hold and is not guaranteed. Connectivity between source and receiver devices 106 and 108 may degrade gradually. Some of receiver devices 108 may not be able to receive their traffic flows, and this depends on the input traffic matrix, the position of the source and receiver devices in the network topology. Reviewing the mathematical expressions and relationships, IP network media data router 102 may be configured with the property of $M \times BW_L \geq N \times BW_P$. "M" may be a function of K, where M=(a/K). Here, "a" is a special case of M where K=1. The fixed value of "a" may be any suitable number greater than K, such as any number greater than two (2), or for example $2 \leq K \leq 10$.

In FIG. 2A, it is shown that spine and leaf switch architecture 200a is configured such that K=1, L=9, M=4, and N=40. In addition, a=K×M=4. The bandwidth of a data link may be expressed in speed or bits per second (bps), such as Gigabits per second (Gbps). In this example, the maximum link bandwidth $BW_L$ of a data link may be provided or set to be 100 Gbps, the maximum port bandwidth $BW_P$ of a bidirectional data port may be provided or set to be 10 Gbps, and the IP network media data router of FIG. 2A may be provided or specified with a maximum of forty (40) bidirectional data ports 252 that may be used for (guaranteed) non-blocking IP multicast delivery of data at a maximum port bandwidth of $BW_P$.

Figure 2B:
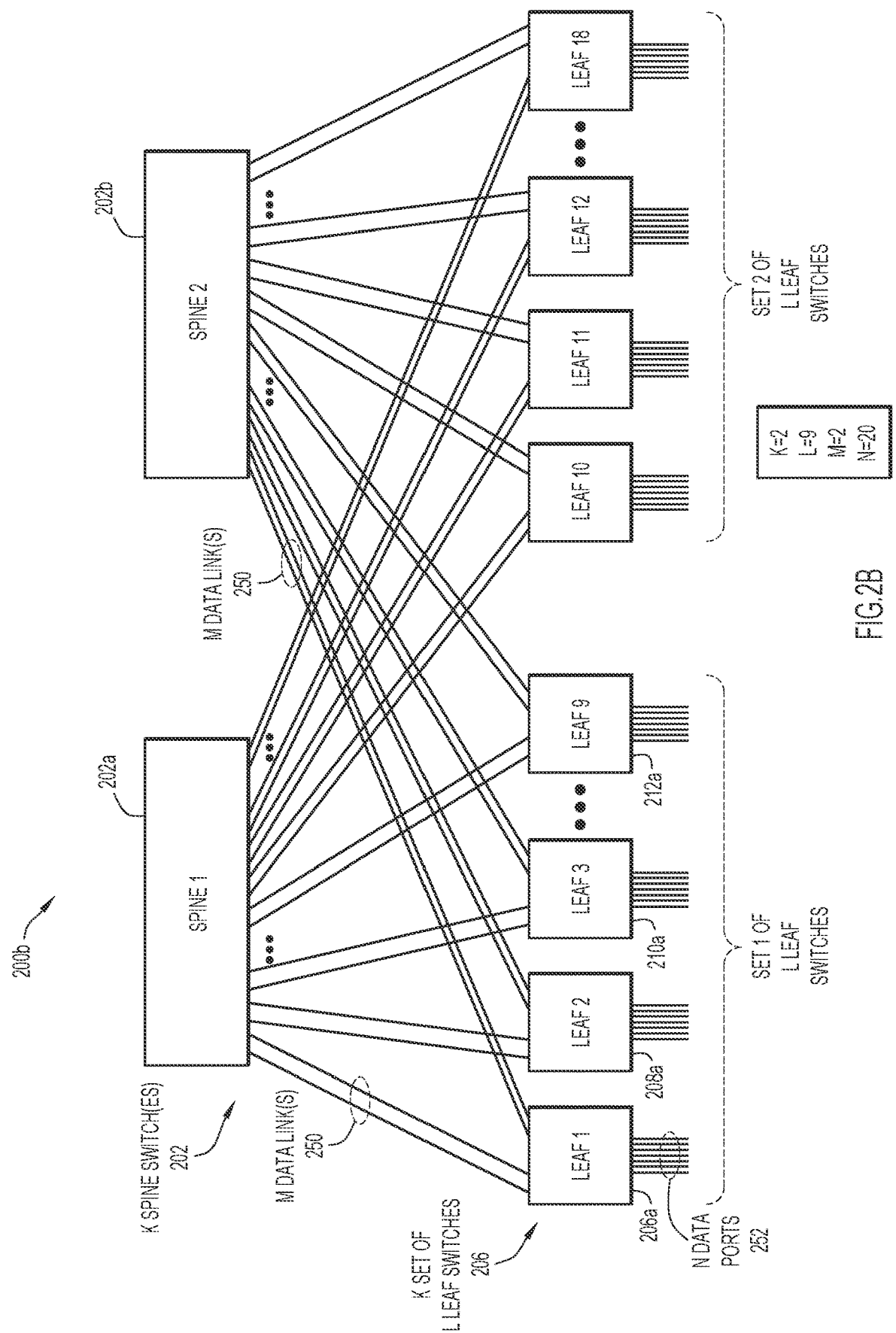
FIG. 2B is an illustration of another example of a spine and leaf switch architecture of the IP network media data router of FIG. 1, which is an example architecture within which at least some implementations of the present disclosure may be realized.

In some implementations, the spine and leaf switch architecture 200a may be reconfigurable and/or expandable to include C additional spine switches and C additional sets of L leaf switches (e.g. of the same or similar manufacture), e.g. for natural numbers of (K×M)/(K+C). To illustrate, FIG. 2B is an illustration of another example of a spine and leaf switch architecture 200b of IP network media data router 102. The spine and leaf switch architecture 200b of FIG. 2B may be substantially the same as or similar to the design of spine and leaf switch architecture 200a of FIG. 2A, except that the architecture has been reconfigured and/or expanded to include C additional spine switches (where C=1, for a total number of 2 spine switches) and C additional sets of L leaf switches (where C=1, for a total number of 2 sets of 9 leaf switches=18 leaf switches) as just previously described. Here, the maximum link bandwidth $BW_L$ of a data link may be maintained to be 100 Gbps, the maximum port bandwidth $BW_P$ of a bidirectional data port may be maintained to be 10 Gbps, and IP network media data router 102 of FIG. 2B may now be provided or specified with a new maximum number of twenty (20) bidirectional data ports 252 for (guaranteed) non-blocking IP multicast delivery of data at a maximum port bandwidth of $BW_P$.

Figure 3A:
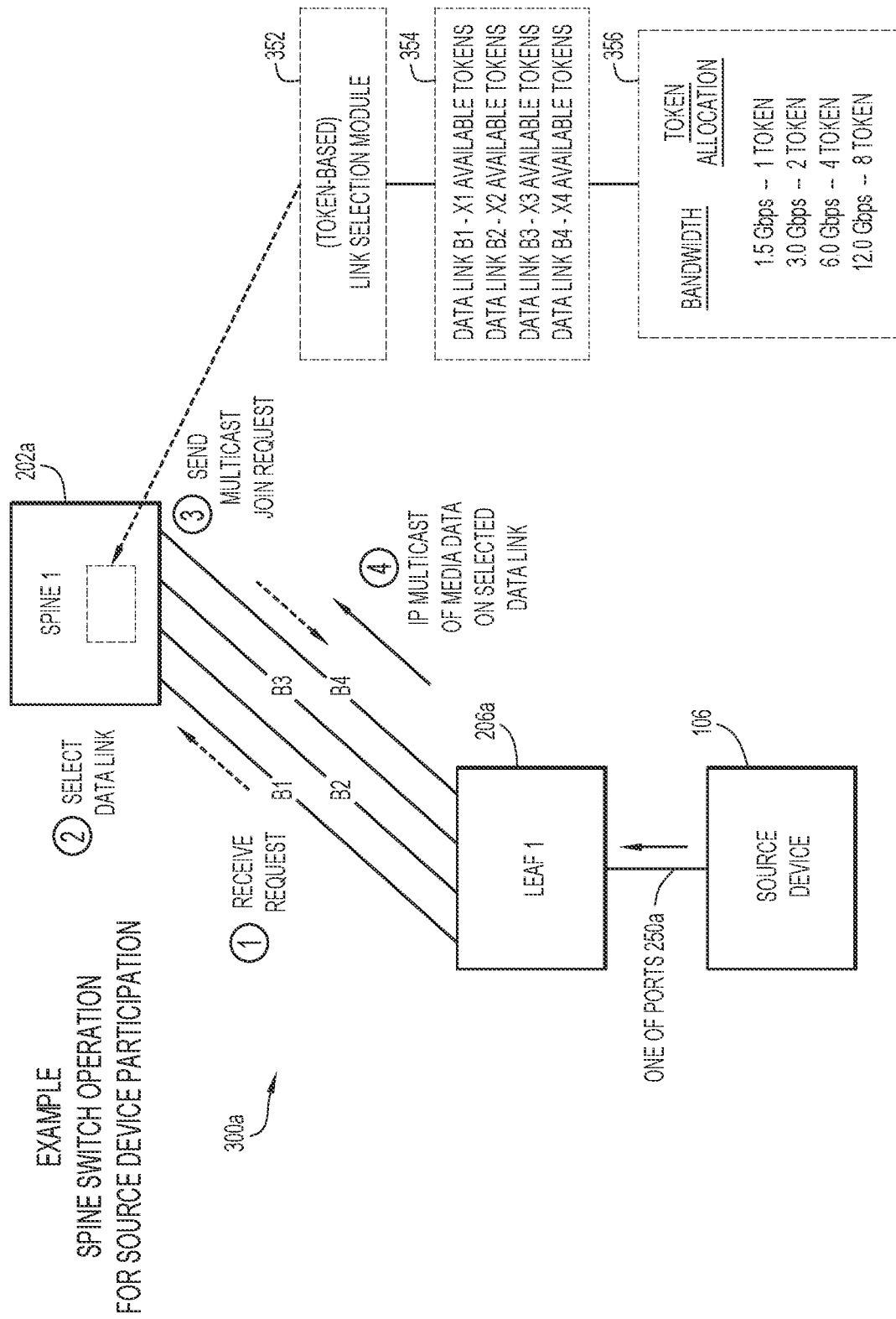
FIG. 3A is a flow diagram for describing a method of operation of a spine switch for source device participation in the IP network media data router of FIGS. 1 and 2A-2B, for further describing an example technique for link bandwidth tracking.
Figure 3B:
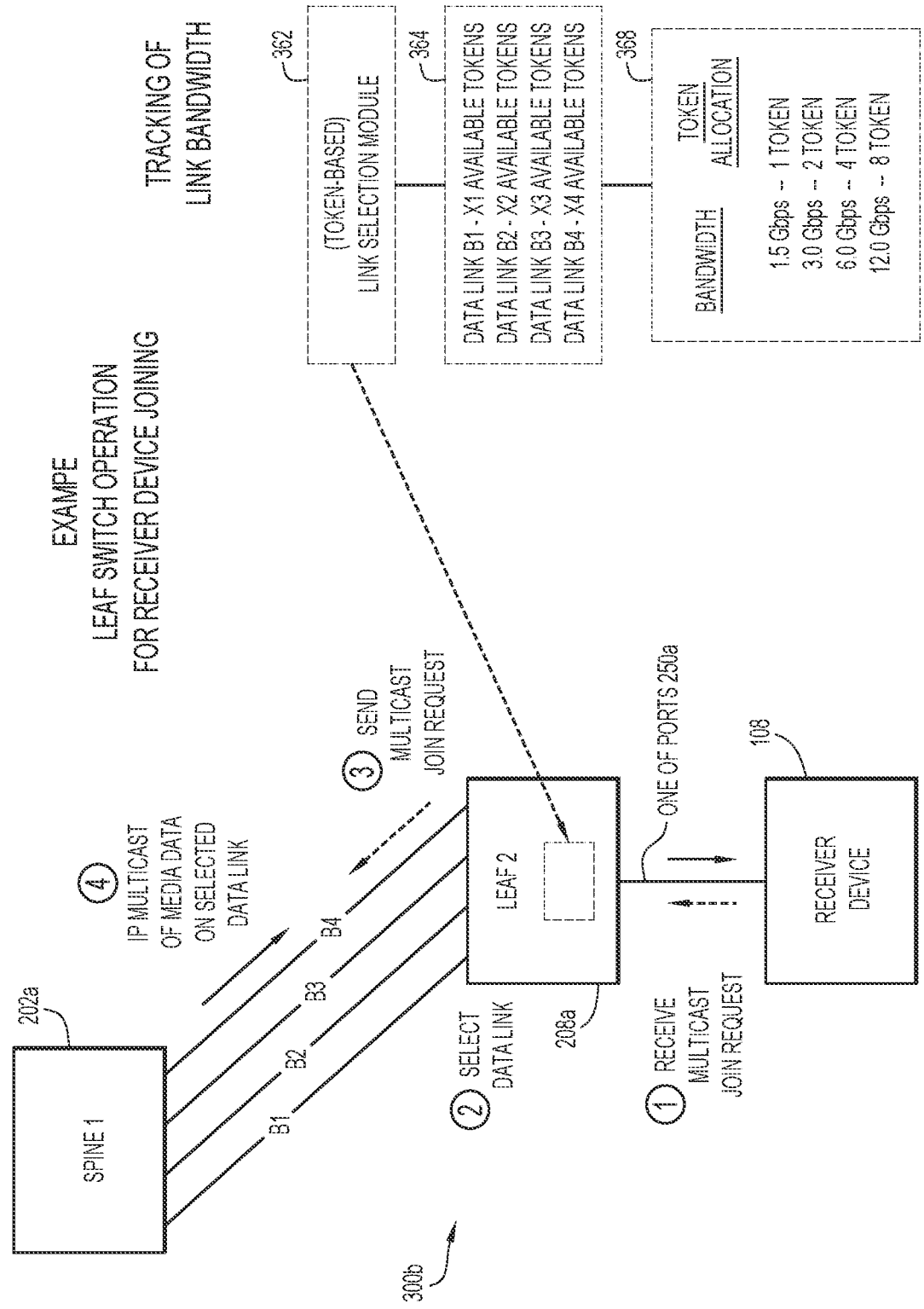
FIG. 3B is a flow diagram for describing a method of operation of a leaf switch for receiver device joining in the IP network media data router of FIGS. 1 and 2A-2B, for further describing an example technique for link bandwidth tracking.

The IP network media data router 102 of FIGS. 1, 2A and/or 2B may operate according to the example operational description now provided in relation to FIGS. 3A and 3B, for the tracking of link bandwidths. Reference will be made back to the spine and leaf switch architecture 200b of FIG. 2B, where $K \geq 2$. In the example implementation to be described, the spine and leaf switch architecture 200b of FIG. 2B may operate such that only a single spine switch (e.g. spine switch 202a) is activated for use and used for IP multicast delivery of media data, so long as bandwidth on the links to the spine switch is available (i.e. bandwidth limit not yet reached; some bandwidth is unused). When bandwidth on the links to the selected spine switch becomes unavailable (i.e. bandwidth limit reached; all bandwidth used), then a next one of the spine switches (e.g. spine switch 202b) may be activated and used for the IP multicast delivery of media data for new requests. Such operation may be continued and/or repeated for additional spine switches.

Here, links between spine and leaf switches may be selected for IP multicast delivery of media data with use of link selection modules. In general, the link selection modules may select data lines in a round robin fashion. In some implementations, the link selection modules may be token-based link selection modules for selecting links while tracking the available/unavailable or used/unused bandwidths on the links, preferably without use of any hashing-based link selection algorithms. Thus, links with a given spine switch may be selected until the bandwidth limit for the links is reached, in which case a new spine switch is activated and used (i.e. a copy of the data may be made to the newly-selected spine switch). Note that if no new spine switch is available, the bandwidth limit for the router has been reached and new host requests may be blocked.

FIG. 3A is a flow diagram 300a for describing a method of example operation associated with a spine switch (e.g. spine switch 202a) for source device participation, for further describing an example technique for tracking link bandwidths. Spine switch 202a may receive a request message from source device 106 via leaf switch 206a (step 1 of FIG. 3A). The request message may be or include PIM register message for registration of the source device 106. In response, the spine switch 202a will have to select one of the links with the leaf switch 206a over which the media data/stream will be communicated (step 2 of FIG. 3A).

In FIG. 3A, the selection of the link may be performed with use of a link selection module 352. In some implementations, link selection module 352 may be a token-based link selection module, where bandwidth of the links is managed, tracked, and/or monitored with use of a stored association 354 between links and available tokens. In token-based link selection, each token may represent a fixed amount of bandwidth. A number of available tokens associated with a given link may represent the current amount of bandwidth available on the link. In FIG. 3A, the stored association 354 is shown between link B1 and X1 available tokens, link B2 and X2 available tokens, link B3 and X3 available tokens, and link B4 and X4 available tokens. An example of a token allocation table 356 is also illustrated in FIG. 3A, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, a token allocation procedure may be performed to track the available/unavailable or used/unused bandwidth of the links. Note that tokens may be deallocated as well when sources and/or receivers withdraw.

Using the token-based link selection module 352 in FIG. 3A, a candidate link with the leaf switch 206a may be selected for consideration. In the example implementation, the selection of candidate links may be performed in a round robin fashion. It is determined whether the number of tokens available for the candidate link is greater than or equal to the number of tokens requested or needed for delivery of the media data. If not (i.e. there is insufficient bandwidth on the candidate link), then it may be determined whether there are any additional candidate links with the leaf switch 206a to consider. If yes, then a next candidate link with the leaf switch 206a is selected for consideration. If not, then a bandwidth limit on the links with the spine switch has been reached. If the number of tokens available for the candidate link is greater than or equal to the number of tokens requested or needed for delivery of the media data (i.e. there is sufficient bandwidth on the candidate link), then the candidate link is selected for the IP multicast delivery of the media data. Here, the number of tokens requested or needed for the delivery of the media data is allocated to the communication from the number of tokens available for the link. Here, a request to join may be sent to the leaf switch 206a on the selected link (step 3 of FIG. 3A). The request to join may be a PIM multicast join. Subsequently, an IP multicast of media data from the source device 106 is received on the selected link via the leaf switch 206a (step 4 of FIG. 3A).

FIG. 3B is a flow diagram 300b for describing a method of operation associated with a leaf switch (e.g. leaf switch 208a) for receiver device joining, for further describing an example technique for the tracking of link bandwidths. Leaf switch 208a may receive a request message from receiver device 108 via a bidirectional data port (step 1 of FIG. 3B). The request message may be or include a request to join a multicast group, for example, a PIM multicast join. In response, the leaf switch 208a will have to select one of the links with a (currently active) spine switch over which the IP multicast delivery of the media data will take place (step 2 of FIG. 3B).

In FIG. 3B, the selection of the link may be performed in the leaf switch 208a with use of a link selection module 362. Operation is similar to that described in the spine switch in relation to FIG. 3A above, but still described here for completeness. In some implementations, link selection module 362 may be a token-based link selection module, where bandwidth of the links is managed, tracked, and/or monitored with use of a stored association 364 between links and available tokens. In the token-based link selection, each token may represent a fixed amount of bandwidth. A number of available tokens associated with a given link may represent the current amount of bandwidth available on the link. In FIG. 3B, the stored association 364 is shown between link B1 and X1 available tokens, link B2 and X2 available tokens, link B3 and X3 available tokens, and link B4 and X4 available tokens. An example of a token allocation table 368 is also illustrated in FIG. 3B, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, a token allocation procedure may be performed for tracking the bandwidth of the links. Note that tokens may be deallocated as well when sources and/or receivers withdraw.

Using the token-based link selection module 362 in FIG. 3B, a candidate link with the leaf switch 208a is selected for consideration. In the example implementation, the selection of candidate links may be performed in a round robin fashion. It is determined whether the number of tokens available for the candidate link is greater than or equal to the number of tokens requested or needed for delivery of the media data. If not (i.e. there is insufficient bandwidth on the candidate link), then it may be determined whether there are any additional candidate links with the spine switch 202a to consider. If yes, then a next candidate link with the spine switch 202a is selected for consideration. If not, then a bandwidth limit on the links with the spine switch 202a has been reached. If the number of tokens available for the candidate link is greater than or equal to the number of tokens requested or needed for delivery of the media data (i.e. there is sufficient bandwidth on the candidate link), then the candidate link is selected for the IP multicast delivery of the media data. Here, the number of tokens requested or needed for the delivery of the media data is allocated to the communication from the number of tokens available for the link. A request to join may be sent to the spine switch 202a on the selected link (step 3 of FIG. 3B). The request to join may be a PIM multicast join. Subsequently, an IP multicast of media data from a source device is received on the selected link via the spine switch 202a (step 4 of FIG. 3B).

Figure 4:
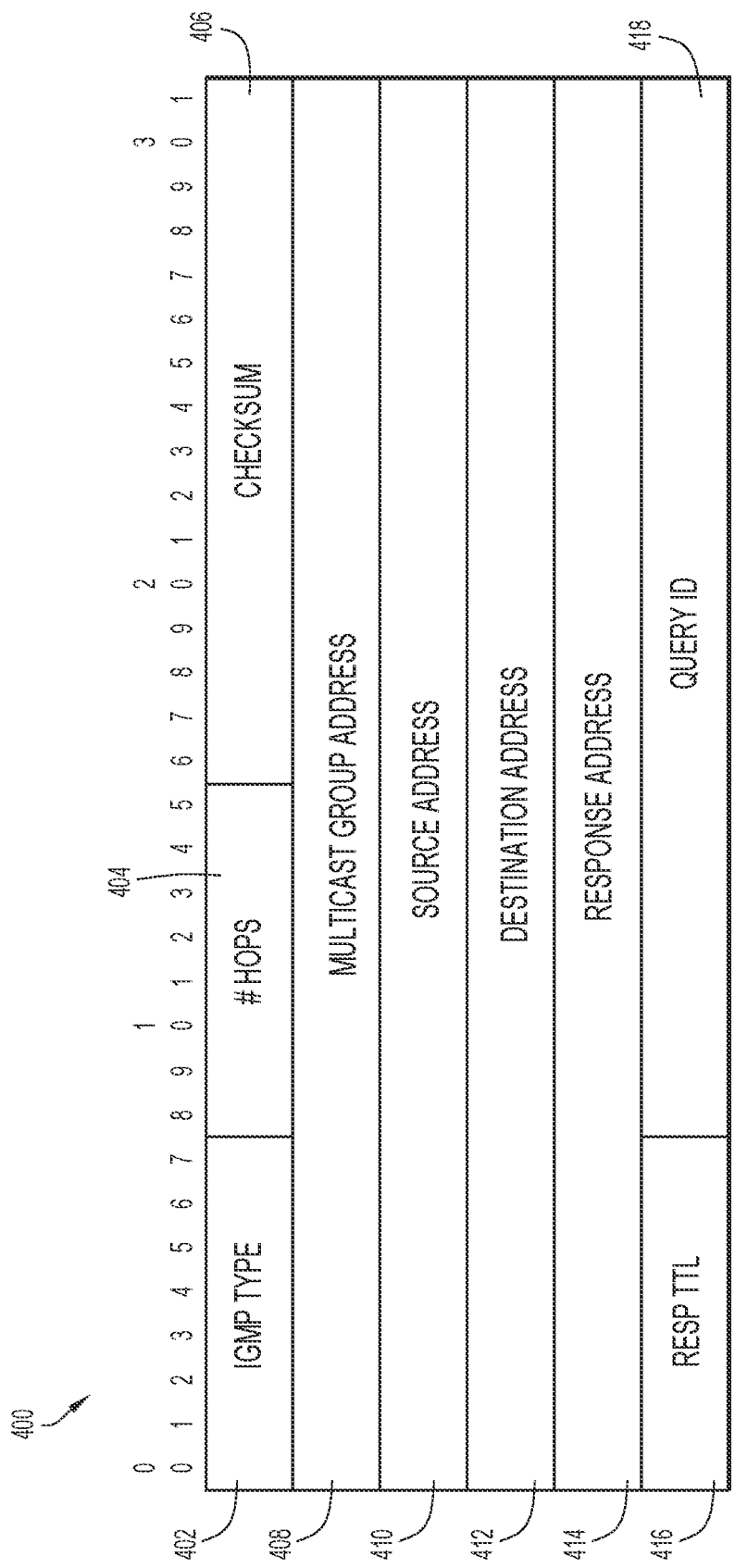
FIG. 4 is a message format of a traceroute query packet for a traceroute query associated with a multicast traceroute facility.

FIG. 4 is a message format 400 of a traceroute query packet for a traceroute query for IP multicast. The traceroute query packet having the message format 400 of FIG. 4 is used in a multicast traceroute facility for tracing a route that a multicast IP packet may take from a source to a particular receiver. The message format 400 of the traceroute query packet includes a plurality of data fields including an IGMP type field 402, a number of hops field 404, a checksum field 406, a multicast group address field 408, a source address field 410, a destination address field 412, a response address field 414, a response time-to-live (TTL) field 416, and a query ID field 418.

The multicast traceroute facility associated with FIG. 4 may be referred to as "Mtrace" which is described in "A 'traceroute' facility for IP Multicast," Internet Engineering Task Force (IETF), Internet-Draft, draft-ietf-idmr-traceroute-ipm-05.txt, by W. Fenner et al., Jun. 25, 1999. Another multicast traceroute facility which may be referred to as "Mtrace2" has an alternative but similar functionality and message formatting, and is described in "Mtrace Version 2: Traceroute Facility for IP Multicast," IETF, Request for Comments: 8487, by H. Asaeda et al., October 2018. Each of the above documents is hereby incorporated by reference as though fully set forth herein.

In general, tracing from a source to a multicast destination is challenging, since it is not known which branch of the multicast tree the destination lies. On the other hand, walking up from destination to source may be achievable, as most multicast routing protocols are able to identify a previous hop for a given source. Tracing from destination to source involves router nodes on the direct path. With multicast traceroute, a network node requesting the traceroute may send a multicast traceroute query packet to the last-hop router node for the given destination. The last-hop router node may turn the multicast traceroute query packet into a corresponding traceroute request packet (e.g. changing the packet type to indicate a corresponding request packet), adding a response block (data segment) containing its interface addresses and packet statistics. The last-hop router node may forward this request packet (e.g. unicast) to the router node that it determines to be its previous-hop router node for the given source and group. Each hop may add its own response block to the end of its corresponding request packet and forward it to the (next) previous hop. The router node that determines that packets from the source originate on one of its directly-connected networks may be deemed the first hop router node. The first hop router node may change the packet type to indicate a corresponding response packet and send the response packet to the network node associated with the response destination address.

As described previously, in the media and broadcasting industry, the broadcast production environment that traditionally leverages SDI infrastructure has been moving to an IP infrastructure. Unfortunately, existing multicast traceroute facilities do not provide adequate capabilities in the broadcast production environment that leverages such IP infrastructure.

Figure 5:
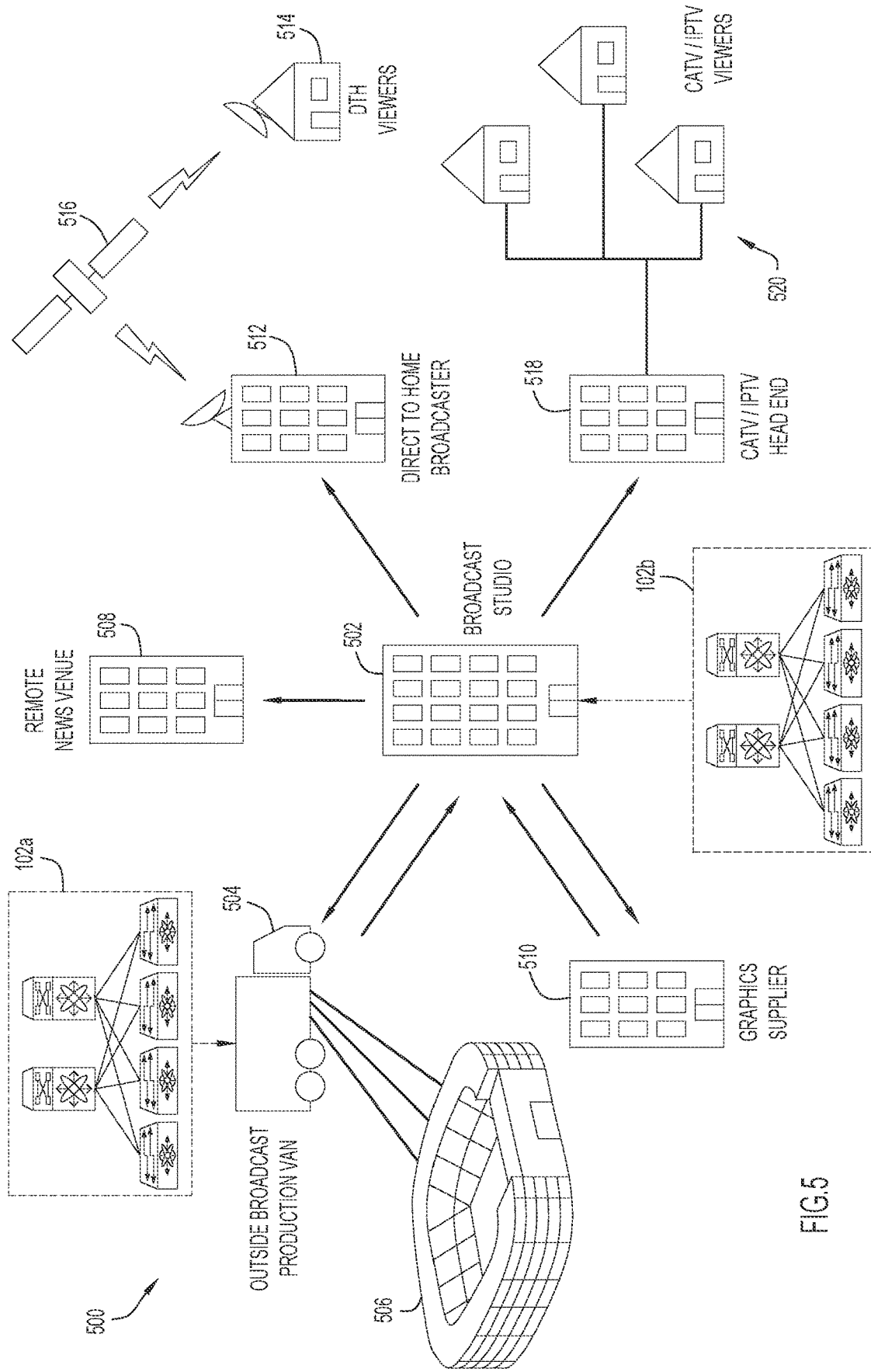
FIG. 5 is an illustrative representation of an example system environment within which the IP network media data router of FIG. 1 may be employed, together with use of a multicast traceroute facility with batch query processing for multiple flows and requested link metrics according to some implementations of the present disclosure.

To better illustrate, FIG. 5 is an illustrative representation of an example system environment 500 within which the IP network media data router 102 of FIG. 1 may be employed. The system environment 500 of FIG. 5 is a broadcast production environment. In this specific illustrated example, the system environment 500 may be a broadcast production environment involving an event at a stadium 506. Here, an outside broadcast production van 504 may carry an IP network media data router 102a which has connections to devices at the stadium 506. A broadcast production studio 502 also includes an IP network media data router 102b which also has connections to IP network media data router 102a at the stadium 506 as well as to devices at a graphics supplier 510. IP network media data router 102b at the broadcast production studio 502 may further connect to a remote news venue 508, a direct-to-home (DTH) broadcaster 512 for broadcasting to DTH viewers 514 via a DTH broadcast satellite 516, and a cable television (CATV)/IP television (IPTV) head end 518 for broadcasting to CATV/IPTV viewers 520. In this environment, host source devices may include cameras and microphones, video server relay and clips, graphic systems, remote sources, and/or any other suitable sources; host receivers may include monitoring systems, video switches, multi-viewers, audio mixers, and/or any other suitable receiver devices.

In environments such as the system environment 500 of FIG. 5, "batch awareness" may be desirable for an end user to be able to get assurance that an entire requested batch of flows may be streamed through the network at (or about) the same time, allowing customers (e.g. the media and broadcasting industry) to be able to send a whole collection of flows at (or about) the same time through the network, together with confidence that the flows will be streamed with a bandwidth guarantee.

Relatedly, network deployments may increasingly rely on the cloud and the virtualization of endpoints that participate in an end-to-end flow. For most deployments, the decision to spawn endpoints in the cloud may be a simple matter of load balancing. For solutions that may require strict administrative constraints (e.g. a guaranteed bandwidth reservation per flow), however, the decision may depend on the state of network at any given point in time. In other words, it may be desirable if not mandatory to assure a suitable path between a desired host sender and receiver before orchestrating the flow between them. In many if not most cases, the assurance of a path may determine where the host sender and receiver should be created.

Accordingly, what is provided for is a multicast traceroute facility with batch query processing for multiple flows and/or reservation of resources for requested link metrics according to some implementations of the present disclosure.

Figure 6:
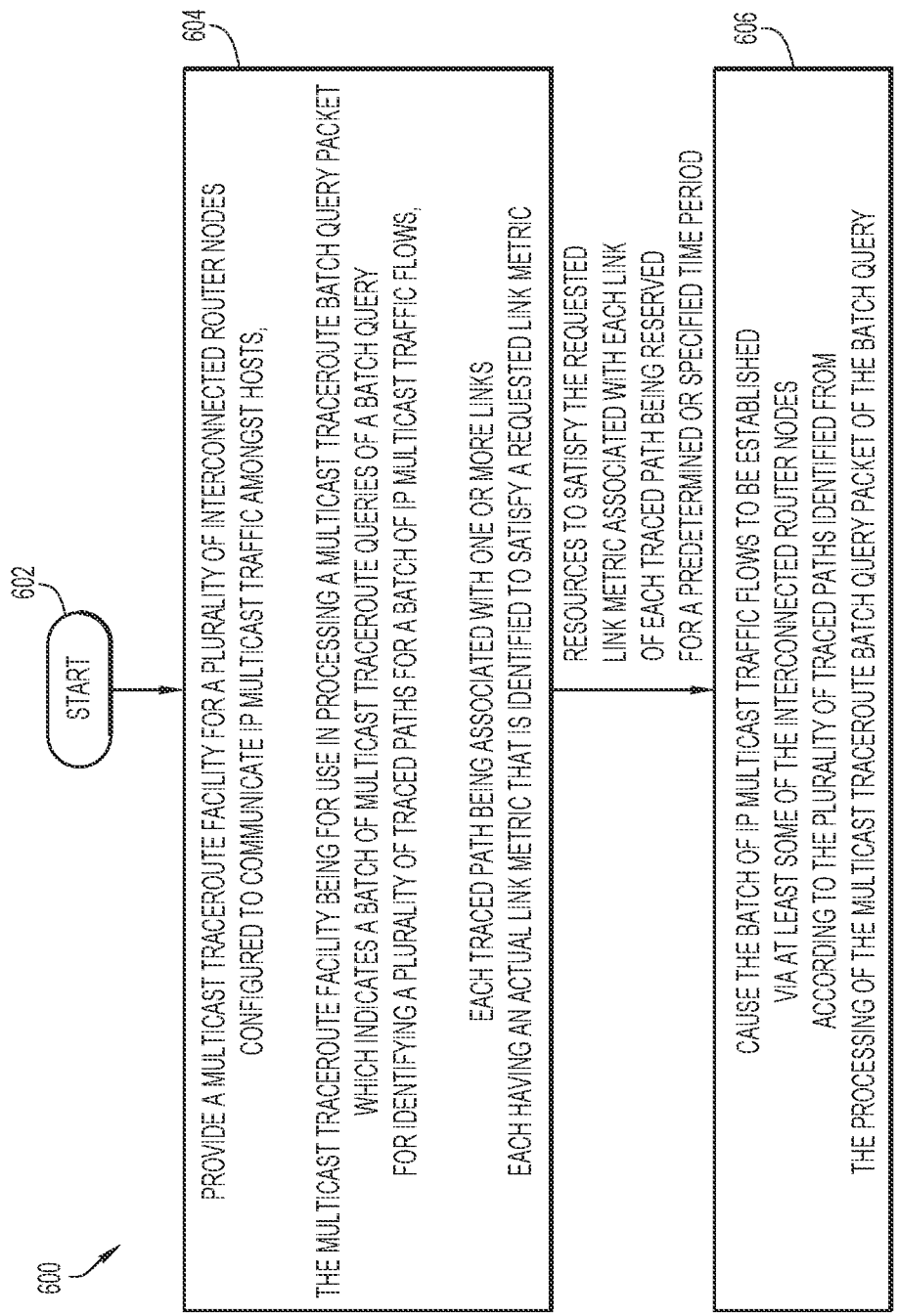

To better explain, FIG. 6 is a flowchart 600 of a method of a multicast traceroute facility for batch query processing for multiple flows and requested link metrics according to some implementations of the present disclosure.

Beginning at a start block 602 of FIG. 6, a multicast traceroute facility may be provided for a plurality of interconnected router nodes which are configured to communicate IP multicast traffic amongst hosts (step 604 of FIG. 6). Each interconnected router node may include a plurality of interfaces and be configured to, for each one of the plurality of interfaces, track a link metric of a link associated with the interface. The multicast traceroute facility may be provided for use in processing a multicast traceroute batch query packet which indicates a batch of multicast traceroute queries of a batch query, for identifying a plurality of traced paths for a batch of IP multicast traffic flows. Each identified traced path may be associated with one or more links each having a link metric (i.e. an actual link metric) that is identified to satisfy a requested link metric. The requested link metric may be specified in the multicast traceroute batch query packet. After processing, the batch of IP multicast traffic flows may be established via at least some of the interconnected router nodes according to the plurality of traced paths identified from the processing of the multicast traceroute batch query packet of the batch query (step 606 of FIG. 6). The batch of IP multicast traffic flows may be established at (or about) the same time.

In some implementations, the requested link metric may be a requested link bandwidth. In additional or alternative implementations, other one or more link metrics (e.g. a link latency) may be requested. In some further implementations, resources to satisfy the requested link metric may be reserved for a predetermined or specified time period. In even further implementations, the time period for reservation may be specified in the multicast traceroute batch query packet.

In some implementations, the multicast traceroute batch query packet for the batch query may include a query ID, and the batch of IP multicast traffic flows may be subsequently requested and established by referencing or specifying the query ID associated with the previous tracing and/or reservation of resources.

In a preferred product implementation, the plurality of interconnected router nodes may be or include a plurality of interconnected switches of an IP network media data router (e.g. IP network media data router 102 described above in relation to FIGS. 1, 2A-2B, 3A-3B, and 5).

FIG. 7 is a flowchart 700 for describing a method of a multicast traceroute facility for batch query processing for multiple flows and requested link metrics according to some implementations of the present disclosure. The method of FIG. 7 may be considered to be a more detailed description of the method of FIG. 6.

Beginning at a start block 702 of FIG. 7, a multicast traceroute facility may be provided for a plurality of interconnected router nodes which are configured to communicate IP multicast traffic amongst hosts (step 704 of FIG. 7). Each interconnected router node may include a plurality of interfaces and be configured to, for each one of the plurality of interfaces, track a link metric of a link associated with the interface. The multicast traceroute facility may be provided for use in processing a multicast traceroute batch query packet which indicates a batch of multicast traceroute queries of a batch query, for identifying a plurality of traced paths for a batch of IP multicast traffic flows. Each multicast traceroute query of the batch query may be associated with a plurality of data fields which indicate a multicast group address, a source address, a destination address, and a requested link metric. In some implementations, the requested link metric may be a requested link bandwidth.

Processing associated with the multicast traceroute batch query packet may result in generation of one or more corresponding request or response packets which indicate a plurality of traceroute responses to the batch of multicast traceroute queries of the batch query (step 706 of FIG. 7). At least in some implementations, state need not be created or instantiated before the tracing; rather, a "phantom" state may be created for the purpose of the trace if and as needed. Each traceroute response may include a list of one or more response blocks which defines a corresponding one of the traced paths for a corresponding one of the IP multicast traffic flows. Each response block of a traceroute response may include at least a previous-hop router address and an incoming interface address. The previous-hop router address may be associated with a previous-hop router node from which IP multicast traffic is expected from a source node that is associated with at least one of the source address and the multicast group address. The incoming interface address may be associated with an incoming interface of the previous-hop router node from which the IP multicast traffic is expected from the source node, where the incoming interface is associated with a link having a link metric (i.e. an actual link metric) that is identified to satisfy the requested link metric of the multicast traceroute query.

In some implementations, the multicast traceroute batch query packet or a corresponding request packet thereof may be received. For each one of at least some of the multicast traceroute queries, the previous-hop router address and the incoming interface address of the incoming interface may be determined and then inserted in a corresponding one of the response blocks for a corresponding one of the traceroute responses.

In some implementations, processing associated with the multicast traceroute batch query packet additionally causes resources for satisfying the requested link metric to be reserved for a predetermined or specified time period (e.g. starting from the time of the query or query packet receipt). For example, the link bandwidth for each link of each traced path may be reserved for a predetermined or specified time period. In some further implementations, the time period for reservation may be specified in the multicast traceroute batch query packet.

After processing, the batch of IP multicast traffic flows may be established via at least some of the interconnected router nodes according to the plurality of traced paths identified from the processing of the multicast traceroute batch query packet of the batch query. The batch of IP multicast traffic flows may be established at (or about) the same time.

In some implementations, the multicast traceroute batch query packet for the batch query may include a query ID, and the batch of IP multicast traffic flows may be subsequently requested and established by referencing or specifying the query ID associated with the previous tracing and/or reservation of resources.

In a preferred product implementation, the plurality of interconnected router nodes may be or include a plurality of interconnected switches of an IP network media data router (e.g. IP network media data router 102 described above in relation to FIGS. 1, 2A-2B, 3A-3B, and 5).

Figure 8A:
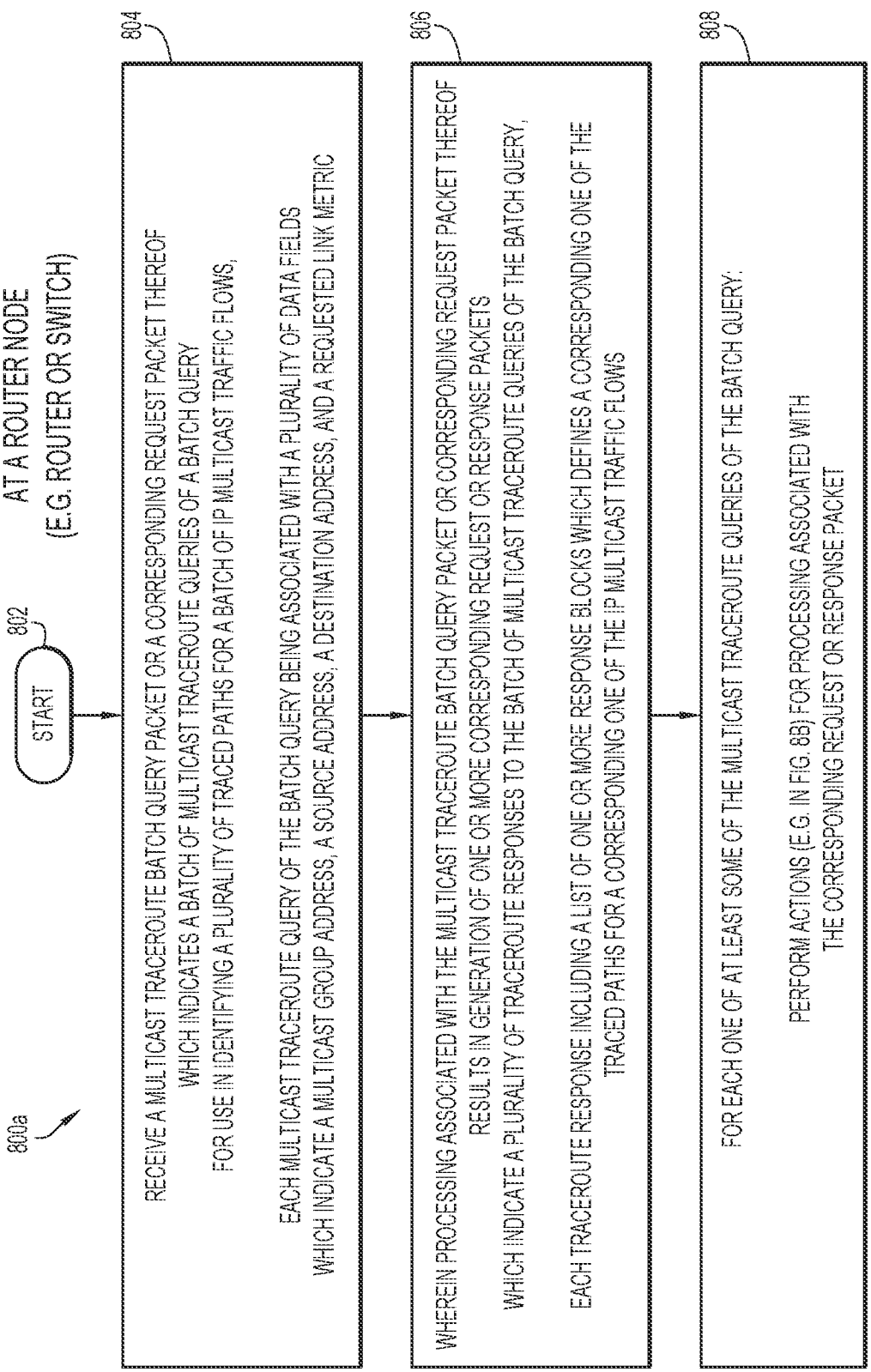

FIG. 8A is a flowchart 800*a* for describing a method of a multicast traceroute facility for batch query processing for multiple flows and requested link metrics according to some implementations of the present disclosure. The method of FIG. 8A may be performed by a router node (e.g. a router or a switch) of a plurality of interconnected router nodes. The router node may include one or more processors, one or more memories coupled to the one or more processors, and one or more interfaces and/or ports. The method may be embodied as a computer program product including a non-transitory computer readable medium and instructions stored in the computer readable medium, where the instructions are executable on one or more processors of the router node for performing the steps of the method.

Beginning at a start block 802 of FIG. 8A, a multicast traceroute batch query packet, or a corresponding request packet thereof, which indicates a batch of multicast traceroute queries of a batch query for use in identifying a plurality of traced paths for a batch of IP multicast traffic flows is received (step 804 of FIG. 8A). Each multicast traceroute query of the batch query may be associated with a plurality of data fields which indicate a multicast group address, a source address, a destination address, and a requested link metric (e.g. link bandwidth or other).

Processing associated with the multicast traceroute batch query packet may result in generation of one or more corresponding request or response packets which indicate a plurality of traceroute responses to the batch of multicast traceroute queries of the batch query (step 806 of FIG. 8A).

At least in some implementations, state need not be created or instantiated before the tracing; rather, a "phantom" state may be created for the purpose of the trace if and as needed. Each traceroute response may include a list of one or more response blocks which defines a corresponding one of the traced paths for a corresponding one of the IP multicast traffic flows. For each one of at least some of the multicast traceroute queries of the batch query, processing associated with a corresponding request or response packet may be performed (step 808 of FIG. 8A). Such processing is provided in relation to a continued flowchart 800*b* of FIG. 8B.

Figure 8B:
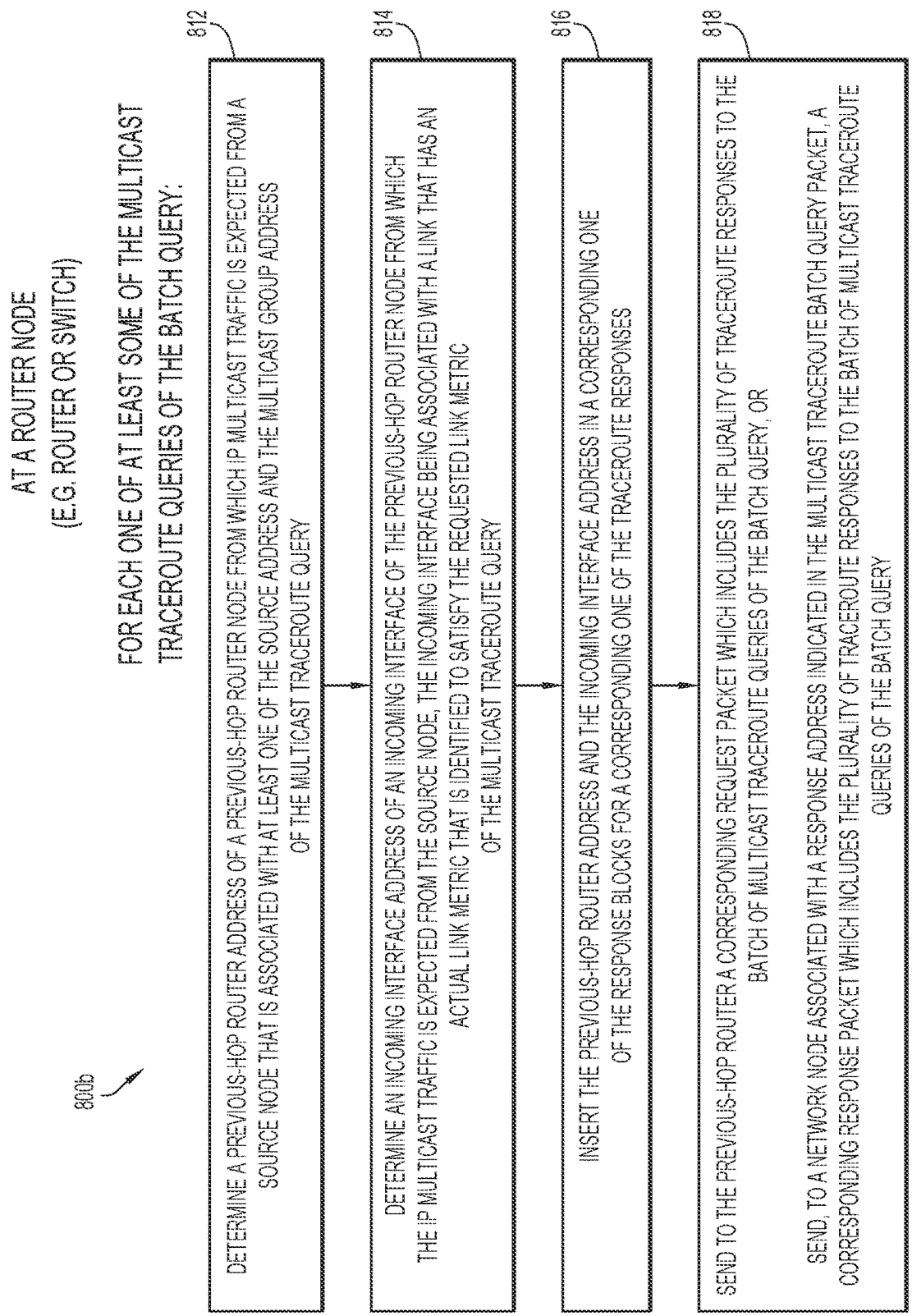

Continuing the method in relation to FIG. 8B, a previous-hop router address of a previous-hop router node from which IP multicast traffic is expected from a source node that is associated with at least one of the source address and the multicast group address of the multicast traceroute query may be determined (step 812 of FIG. 8B). In addition, an incoming interface address of an incoming interface of the previous-hop router node from which the IP multicast traffic is expected from the source node may be determined (step 814 of FIG. 8B). The incoming interface is associated with a link that has a link metric (i.e. an actual link metric) that is identified to satisfy the requested link metric of the multicast traceroute query.

In some implementations, resources to satisfy the requested link metric (e.g. the link bandwidth, for each link of each traced path) may be reserved for a predetermined or specified time period (e.g. starting from the time of the query or query packet receipt). In some further implementations, the time period for reservation may be specified in the multicast traceroute batch query packet.

The previous-hop router address and the incoming interface address may be inserted in a corresponding one of the traceroute responses (step 816 of FIG. 8B). If a request packet is being processed, then a corresponding request packet which includes the plurality of traceroute responses to the batch of multicast traceroute queries of the batch query may be sent to the previous-hop router (processing of step 818 of FIG. 8B). Alternatively, if a response packet is being processed, then a corresponding response packet which includes the plurality of traceroute responses to the batch of multicast traceroute queries of the batch query may be sent to a network node associated with a response address indicated in the multicast traceroute batch query packet (alternative processing of step 818 of FIG. 8B).

In some scenarios, the multicast traceroute batch query packet or corresponding request packet thereof may be "split" and forwarded to two (or more) different previous-hop router nodes for two (or more) different multicast groups or sources. Here, a router node may receive a multicast traceroute batch query packet or corresponding request packet. The router node may generate and send a first corresponding request packet to a first previous-hop router from which IP multicast traffic is expected from a first source node that is associated with at least one of a first source address and a first multicast group address of a first multicast traceroute query indicated in the received packet. Also, the router node may generate and send a second corresponding request packet to a second previous-hop router from which IP multicast traffic is expected from a second source node that is associated with at least one of a second source address and a second multicast group address of a second multicast traceroute query indicated in the received packet.

In some scenarios, there may be a failure in determining a previous-hop router address of a previous-hop router node from which IP multicast traffic is expected from the source node that is associated with at least one of the source address and the multicast group address of the multicast traceroute query. Additionally or alternatively, in some scenarios, there may be a failure in determining an incoming interface address of the previous-hop router node where the incoming interface address is associated with an incoming interface for a link that has a link metric that satisfies the requested link metric of the multicast traceroute query. In response to such failure(s) in determining, a response packet which indicates a failure may be generated and sent back to the forwarding, requesting, or response router node.

Receipt of the response packet indicating a failure may cause the receiving router node to attempt one or more alternative paths or approaches to the batch query. For example, what may be determined here is a new previous-hop router address of a new previous-hop router node from which IP multicast traffic is expected from the source node that is associated with at least one of the source address and the multicast group address of the multicast traceroute query. Additionally or alternatively, what may be determined here is a new incoming interface address associated with a new incoming interface for a new link that has a link metric that satisfies the requested link metric of the multicast traceroute query.

Figure 9A:
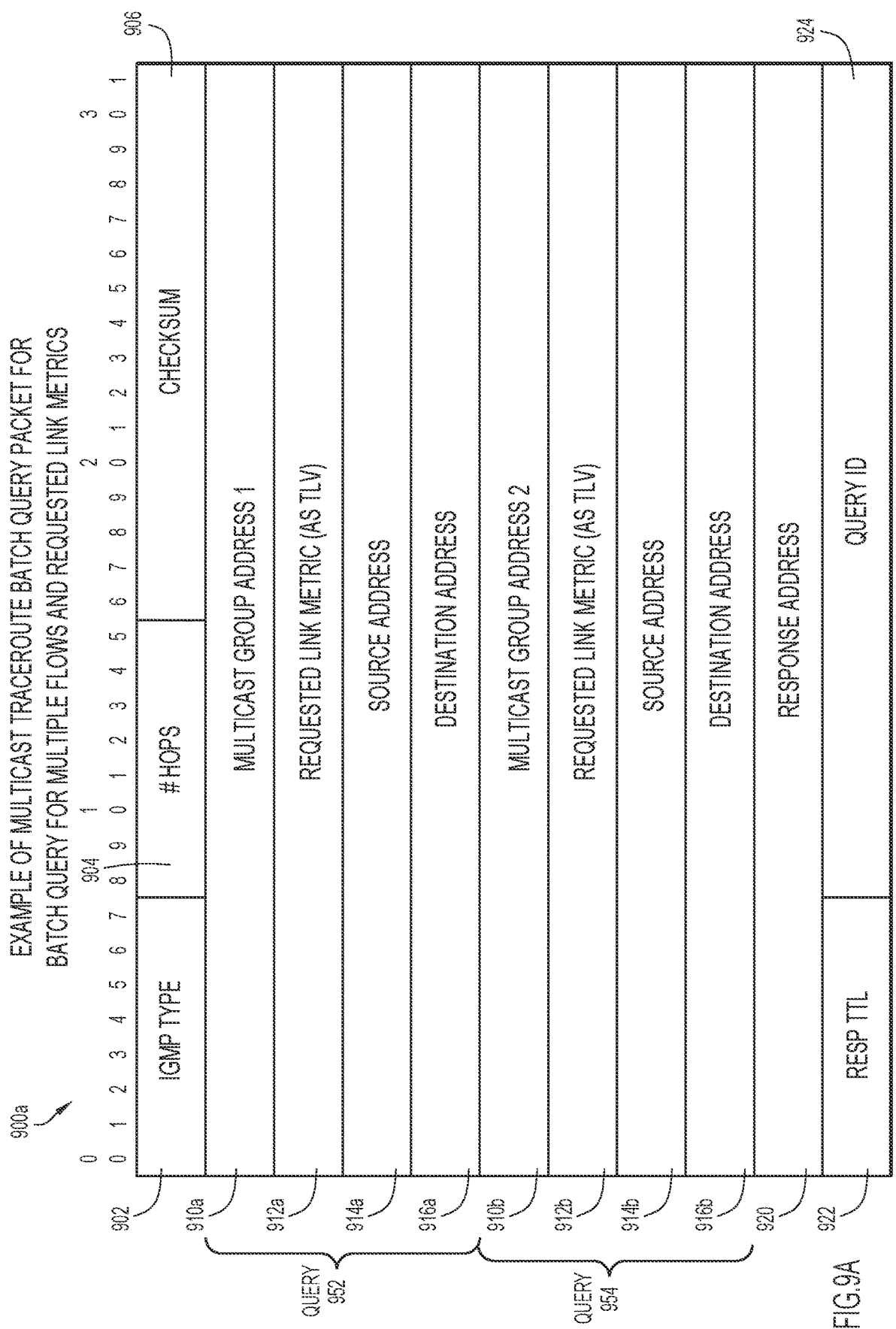
FIG. 9A is an illustrative example of a message format of a multicast traceroute batch query packet for batch query processing for multiple flows and requested link metrics according to some implementations of the present disclosure.

FIG. 9A is an illustrative example of a message format 900a of a multicast traceroute batch query packet for batch query processing for multiple flows and requested link metrics according to some implementations of the present disclosure. In the multicast traceroute batch query packet for batch query processing, multiple requests may be carried in a single payload and capability (e.g. link bandwidth) may be provided as a type-length-value (TLV).

In FIG. 9A, the multicast traceroute batch query packet indicates a batch of multicast traceroute queries of a batch query, for identifying a plurality of traced paths for a batch of IP multicast traffic flows. In the example of FIG. 9A, the number of multicast traceroute queries in the multicast traceroute batch query packet is two (2); the batch of multicast traceroute queries includes a multicast traceroute query 952 and a multicast traceroute query 954. One or more additional multicast traceroute queries may be provided as well.

For multicast traceroute query 952 of the batch query, a multicast group address field 910a may specify the multicast group address to be traced, and a source address field 914a may specify an IP address of the multicast source for the path being traced. A destination address field 916a may specify an IP address of the multicast receiver for the path being traced. A requested link metric 912a may specify a requested link metric (e.g. link bandwidth) associated with the link.

Similarly, for multicast traceroute query 954 of the batch query, a multicast group address field 910b may specify the multicast group address to be traced, and a source address field 914b may specify an IP address of the multicast source for the path being traced. A requested link metric 912b may specify a requested link metric (e.g. link bandwidth) associated with the link. A destination address field 916b may specify an IP address of the multicast receiver for the path being traced.

Upon successful processing of the multicast traceroute batch query packet, each identified traced path will be associated with one or more links each having a link metric that is identified to satisfy the requested link metric. For example, a traced path associated with multicast traceroute query 952 will have one or more links having the requested link metric 912a, and a traced path associated with multicast traceroute query 954 will have one or more links having the requested link metric 912b.

The message format 900a of the multicast traceroute query packet may further include one or more additional data fields, such as an IGMP type field 902, a number of hops field 904, a checksum field 906, a response TTL field 922, a query ID field 924, and a response address field 920. IGMP type field 902 may specify the type of message, for example, it may be a first value for traceroute queries and requests, and a second value for a traceroute response. The number of hops field 904 may specify the maximum number of hops that the request wants to trace. Checksum field 906 may specify a checksum, for example, the 16-bit one's complement of the one's complement sum of the whole IGMP message (the entire IP payload). Response TTL field 922 may specify the TTL at which to multicast the response, if the response address is a multicast address. Query ID field 924 may specify a unique identifier for the traceroute batch request. Response address field 920 may specify where the completed traceroute response packet should be sent (e.g. a network node serving as a response node).

FIG. 9B is an illustrative example of a data grouping 900b of one or more traceroute request or response packets which indicate a plurality of traced paths (e.g. traced path 1, traced path 2, etc.) associated with a batch of IP multicast traffic flows, where each traced path is indicated as a list of one or more response blocks (e.g. response block 1, response block 2, etc.). More specifically, the one or more corresponding request or response packets may include a plurality of traceroute responses 932, 934 to a batch of multicast traceroute queries of a batch query. Each traceroute response 932, 934 may be or include a list of one or more response blocks (e.g. response block 1, response block 2, etc.) which defines a corresponding one of the traced paths (e.g. traced path 1, traced path 2, etc.) for a corresponding one of the IP multicast traffic flows.

FIG. 9C is an illustrative example of a message format 900c of a response block for the data grouping of FIG. 9B. Each response block may indicate at least a previous-hop router node and an incoming interface of the previous-hop router node, where the incoming interface is associated with a link having a link metric that is identified to satisfy the requested link metric. The previous-hop router may be specified in a previous-hop router address field 946, and the incoming interface of the previous-hop router node may be specified in an incoming interface address field 944. An outgoing interface of the previous-hop router node may also be specified in an outgoing interface address field 946. Other data fields may optionally be used as shown.

Figure 10A:
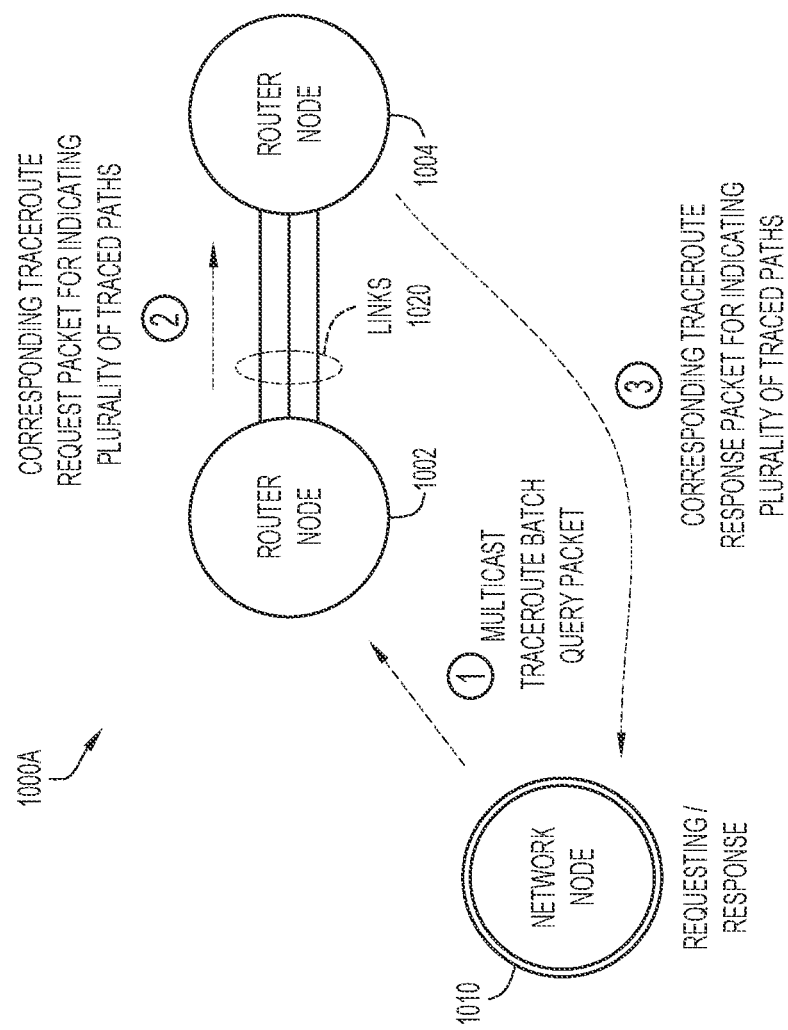
Figure 10C:
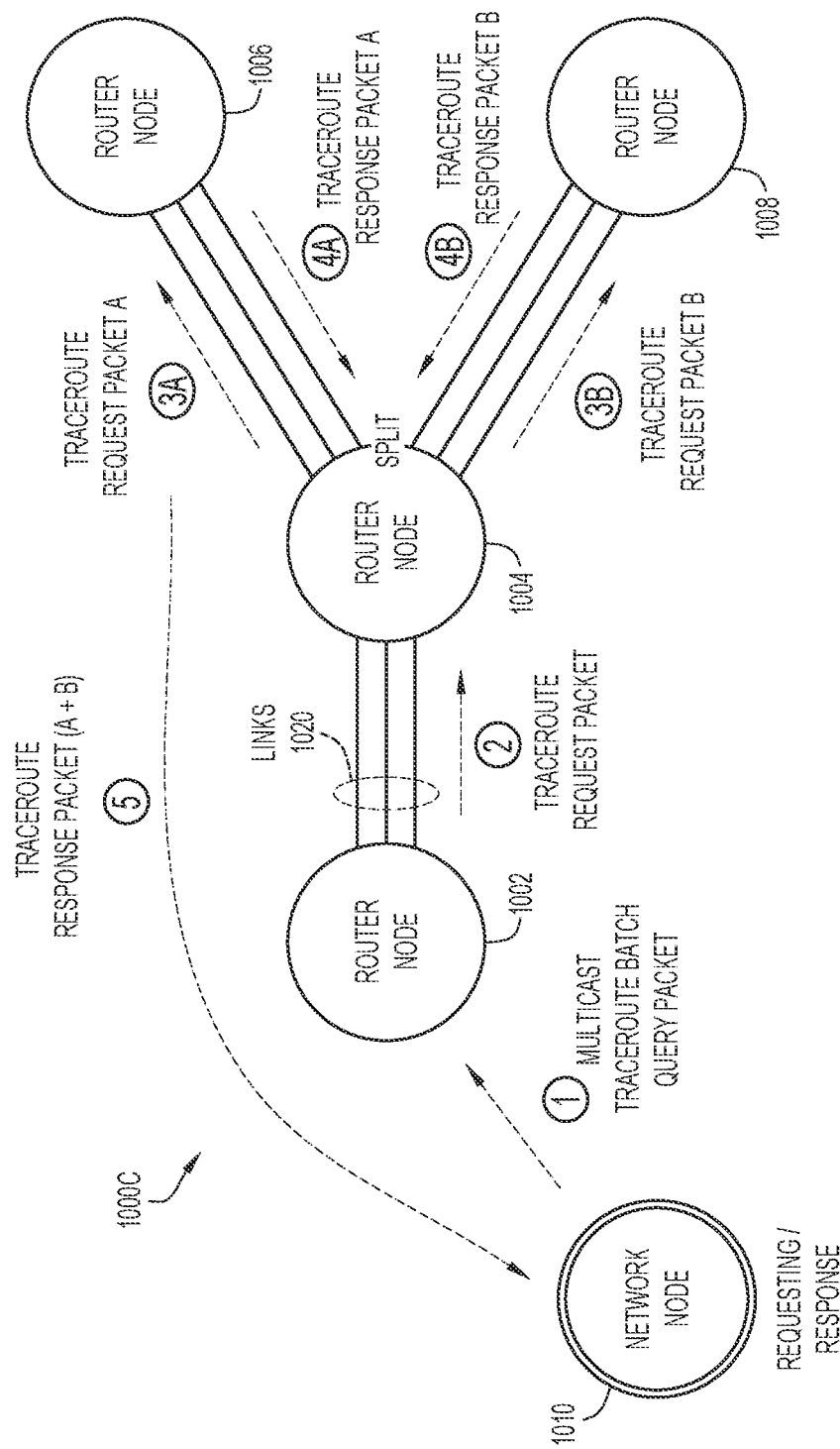

FIGS. 10A, 10B, and 10C are basic process flow diagrams 1000A, 1000B, and 1000C for describing batch query processing for multiple flows and requested link metrics according to some implementations of the present disclosure. The process flow diagrams 1000a, 1000b, and 1000c in FIGS. 10A, 10B, and 10C are provided with simplified network node arrangements in order to more clearly and easily explain basic processing which may be employed for batch queries.

In FIG. 10A, the network node arrangement includes router nodes 1002 and 1004 which are interconnected via a plurality of links 1020. A network node 1010 may serve as a requesting and response node for batch queries. Router nodes 1002 and 1004 and network node 1010 may utilize a multicast traceroute facility according to some implementations of the present disclosure. To begin, network node 1010 of FIG. 10A which serves as the requesting node may send a multicast traceroute batch query packet for receipt at router node 1002 which may be deemed a last-hop router (step 1 of FIG. 10A). The multicast traceroute batch query packet may indicate a batch of multicast traceroute queries of a batch query. This multicast traceroute batch query packet may be the one described earlier in relation to FIG. 9A.

Router node 1002 may process each multicast traceroute query indicated in the multicast traceroute batch query packet. For each multicast traceroute query, router node 1002 may determine a previous-hop router address of a previous-hop router node from which IP multicast traffic is expected from a source node. Router node 1002 may also determine an incoming interface address of an incoming interface of the previous-hop router node from which the IP multicast traffic is expected from the source node, where the incoming interface is associated with a link that has a link metric that is identified to satisfy the requested link metric of the multicast traceroute query. Router node 1002 may insert the previous-hop router address and the incoming interface address in the appropriate response blocks of a corresponding traceroute request packet, and send the corresponding traceroute request packet to its previous-hop router which is router node 1004 (step 2 of FIG. 10A). The response blocks may correspond to those described earlier in relation to FIG. 9B.

Router node 1004 may receive and process the corresponding traceroute request packet. Router node 1004 may determine that it is the first-hop router and therefore it may change the traceroute request packet into a corresponding traceroute response packet. Router node 1004 may send the corresponding traceroute response packet to the response node which is network node 1010 (step 3 of FIG. 10A). Here, each list of one or more response blocks will define a corresponding one of a plurality of traced paths for a corresponding one of a plurality of IP multicast traffic flows.

In FIG. 10B, the network node arrangement is the same as that in FIG. 10A but further includes a router node 1006 and a router node 1008. Router node 1006 is connected to router node 1004 via a plurality of links, and router node 1008 is connected to router node 1004 via another plurality of links. Here, router node 1004 may determine that it is not the first-hop router, and therefore it may process the corresponding traceroute request packet in the same or similar manner as router node 1002 previously described. However, router node 1004 may further determine that the batch query should be "split" or separated to perform processing associated with two different multicast groups or sources.

More specifically, router node 1004 may split the batch query into a corresponding traceroute request packet A and corresponding traceroute request packet B. Router node 1004 may send the corresponding traceroute request packet A to a first previous-hop router node (i.e. router node 1006) associated with a first multicast group (step 3A of FIG. 10B), and send the corresponding traceroute request packet B to a second previous-hop router node (i.e. router node 1008) associated with a second multicast group (step 3B of FIG. 10B). Upon receipt and processing, router node 1006 may change the corresponding traceroute request packet A to a corresponding traceroute response packet A, and send the corresponding traceroute response packet A to network node 1010 (step 4A of FIG. 10B). Also upon receipt and processing, router node 1008 may change the corresponding traceroute request packet B to a corresponding traceroute response packet B, and send the corresponding traceroute response packet A to the response node which is network node 1010 (step 4B of FIG. 10B). Network node 1010 may group the traceroute responses and/or response blocks from the traceroute response packets A and B for processing. Here, each list of one or more response blocks will define a corresponding one of a plurality of traced paths for a corresponding one of a plurality of IP multicast traffic flows.

In FIG. 10C, the network node arrangement and the batch query "split" at router node 1004 are the same as that described in relation to FIG. 10B; here, however, router node 1006 may process and send the traceroute response packet A back to router node 1004 (step 4A of FIG. 10C) and router node 1008 may process and send the traceroute response packet B also back to router node 1004 (step 4B of FIG. 10C). Router node 1004 may receive the traceroute response packets A and B, and combine or group the traceroute responses and/or response blocks from the traceroute response packets A and B. Router node 1004 may send a resulting traceroute response packet (A+B) to the response node which is network node 1010 (step 5 of FIG. 10C). Again, each list of one or more response blocks will define a corresponding one of a plurality of traced paths for a corresponding one of a plurality of IP multicast traffic flows.

Note that the process flow diagrams 1000a, 1000b, and 1000c in FIGS. 10A, 10B, and 10C are merely examples of processing associated with a multicast traceroute batch query packet. In any such implementations, the processing may result in generation of one or more corresponding request or response packets which indicate a plurality of traceroute responses to the batch of multicast traceroute queries of the batch query. Each traceroute response may include a list of one or more response blocks which defines a corresponding one of the traced paths for a corresponding one of the IP multicast traffic flows.

Note that, in some preferred implementations, the multicast traceroute facility of the present disclosure may be based on and/or provided as an extension to Mtrace or Mtrace2 as described earlier above.

FIGS. 11A through 11L are process flow diagrams involving node arrangements for describing a multicast traceroute facility for batch query processing for multiple flows and requested link metrics according to some implementations of the present disclosure. In the following description, FIGS. 11A through 11L are described in sequence to convey example operation in relation to different scenarios. As will become apparent, the example operation may involve more detailed and/or alternative implementations and techniques as those described in relation to the previous figures.

Figure 11A:
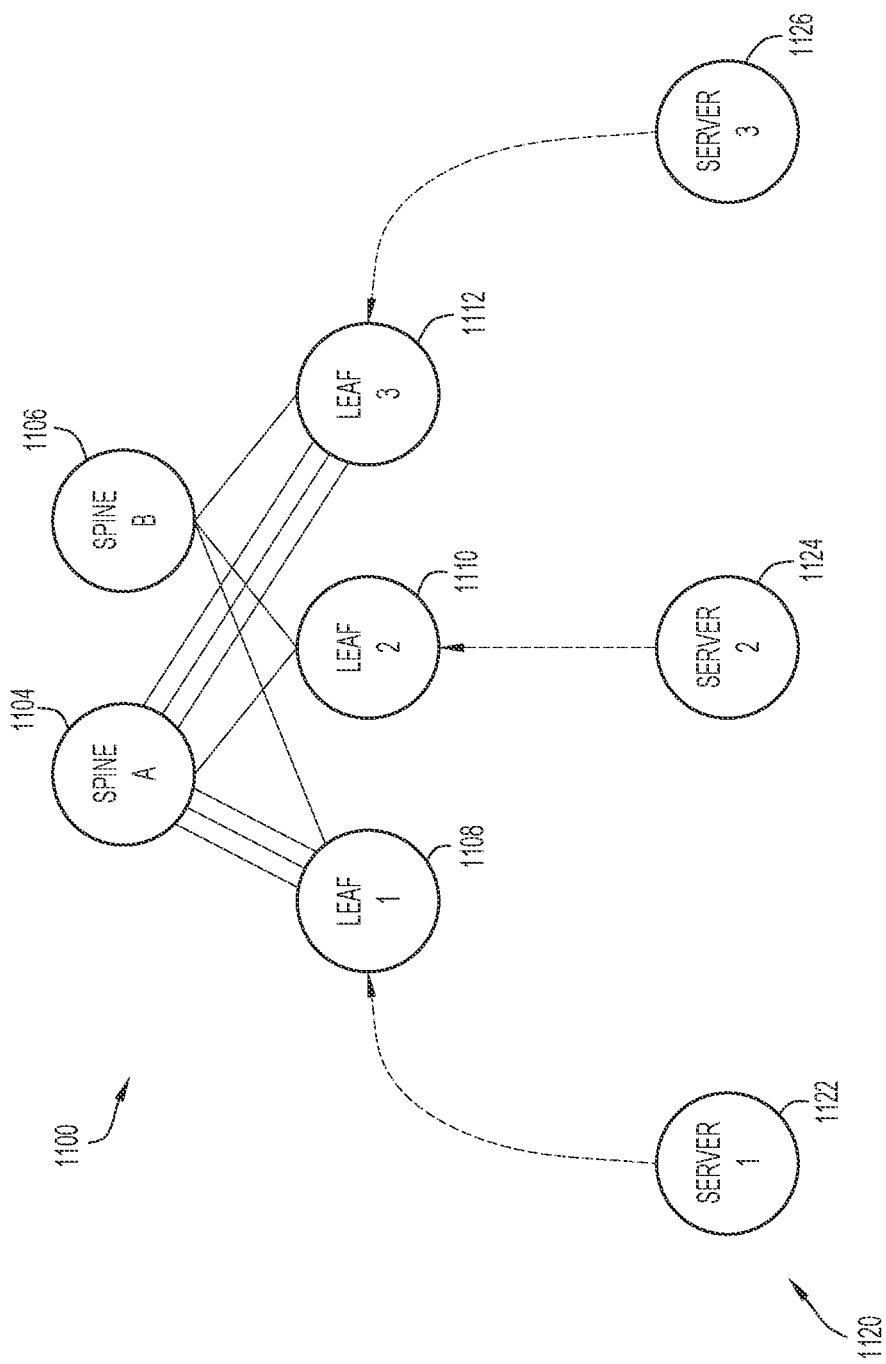

In FIG. 11A, an illustrative representation of a node arrangement of a plurality of interconnected switches 1100 in a spine and leaf architecture is shown. In some implementations, the plurality of interconnected switches 1100 in the spine and leaf architecture may be part of the IP network media data router 102 of FIG. 1 and included in the example system environment 500 of FIG. 5.

As shown in FIG. 11A, what is shown is that the plurality of interconnected switches 1100 in the spine and leaf architecture may include spine switches 1104 and 1106 (Spine A and Spine B, respectively) and leaf switches 1108, 1110, and 1112 (Leaf 1, Leaf 2, and Leaf 3, respectively) connected as shown. Spine switch 1104 is shown to have three links with leaf switch 1108, one link with leaf switch 1110, and three links with leaf switch 1112. Spine switch 1106 is shown to have one link with leaf switch 1108, one link with leaf switch 1110, and one link with leaf switch 1112.

A plurality of servers 1120 are shown which include servers 1122, 1124, and 1126 (Server 1, Server 2, and Server 3). Senders and receivers may be created or spawned on any of the plurality of servers 1120. As described earlier above, the decision to spawn endpoints that involve strict administrative constraints (e.g. guaranteed bandwidth per flow) may depend on the state of network at any given point in time. It may be desirable if not mandatory to assure a suitable path between a desired sender and receiver before orchestrating the flow between them. In many if not most cases, the assurance of a path may determine where the sender and receiver should be created.

Switches, such as spine switches 1104 and 1106, may keep a record of bandwidth utilization and/or availability associated with ingress and egress interfaces and/or its links. This assists the network in guaranteeing bandwidth for flows streaming through it and preventing an over-provisioning of links.

Figure 11B:
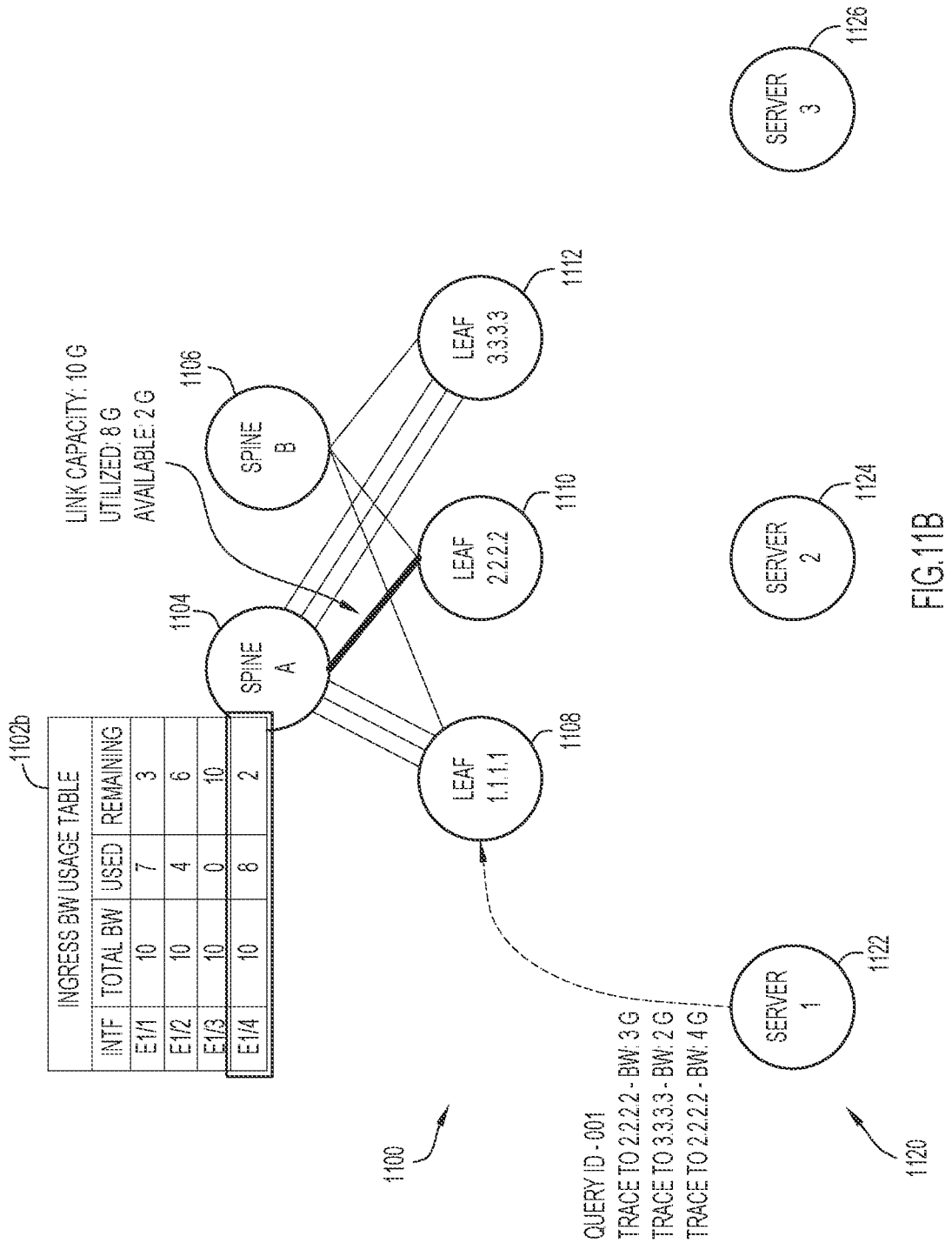

To better illustrate in relation to FIG. 11B, a table 1102b for bandwidth usage for ingress (incoming) interfaces of spine switch 1104 is shown. Table 1102b for bandwidth usage has rows indicating interfaces E1/1, E1/2, E1/3, and E1/4, and columns indicating a total bandwidth (BW), a utilized BW, and a remaining BW. Bandwidth usage may be tracked using any suitable technique (see e.g. the description associated with FIGS. 3A-3B above). As indicated in FIG. 11B, leaf switch 1108 is associated with address 1.1.1.1, leaf switch 1110 is associated with address 2.2.2.2, and leaf switch 1112 is associated with address 3.3.3.3.

As indicated in FIG. 11B, server 1122 may send to leaf switch 1108 a multicast traceroute batch query packet for a batch query. The batch query associated with Query ID=001 indicates a batch of multicast traceroute queries (e.g. 3 total) which include a trace to address 2.2.2.2. with a requested link bandwidth of 3 Gbps, a trace to address 3.3.3.3 with a requested link bandwidth of 2 Gbps, and a trace to address 2.2.2.2 with a requested link bandwidth of 4 Gbps. In this illustrative example, an interface between spine switches 1104 and 1106 is overutilized, where only 2 Gbps are available for spine switch 1104 to receive from leaf switch 1110.

When a switch receives a multicast traceroute batch query packet, the switch may create a snapshot copy of its table for bandwidth usage and associate it with the query ID in the packet. The switch may use and update that snapshot copy of the table for each and every request associated with the same query ID. In some implementations, the snapshot copy of the table for bandwidth usage may be used in a (temporary) reservation of bandwidth for an associated batch query packet.

In some implementations, the table may be aged based on a PIM aging scheme. For example, a snapshot copy of a table may be cleared upon expiration of a first predetermined time period (e.g. 3 minutes), where each receipt of a traceroute request having the same query ID may extend the life of the snapshot copy by a second predetermined time period (e.g. 1 minute).

Figure 11C:
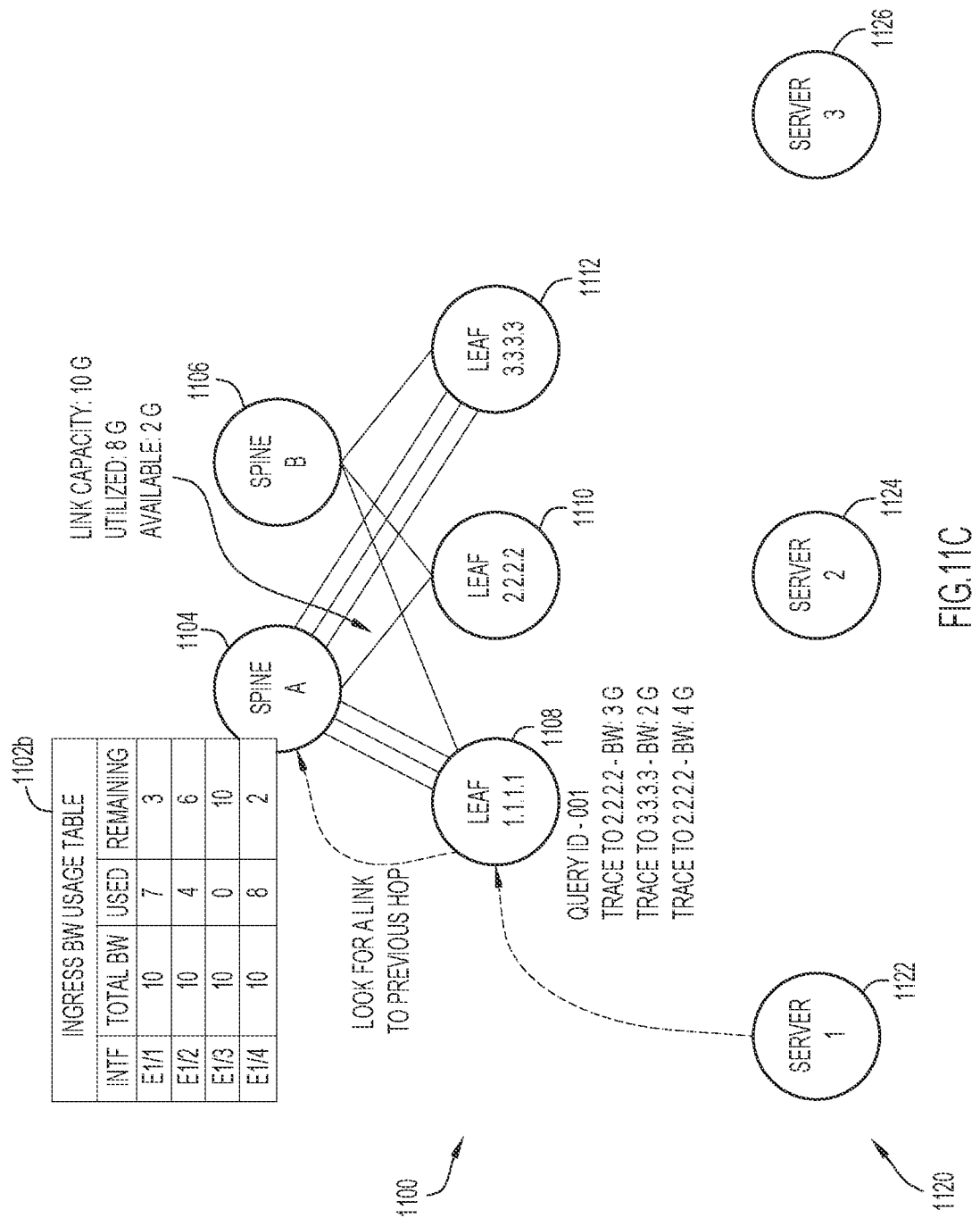
Figure 11D:
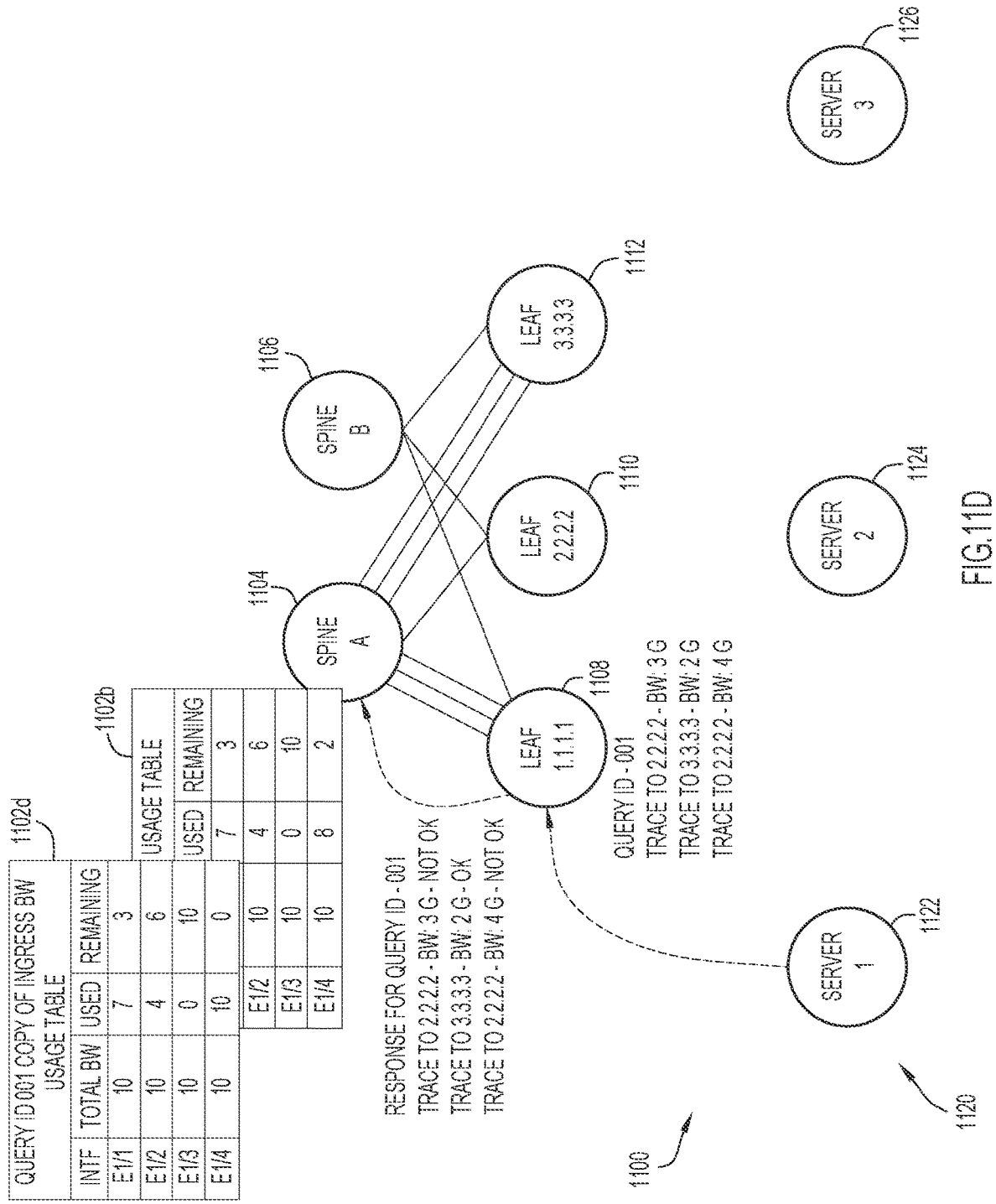

With reference now to FIG. 11C, it is illustrated that leaf switch 1108 may determine its previous-hop router node as spine switch 1104 and therefore forward on a corresponding traceroute request to spine switch 1104. In FIG. 11D, it is shown that a snapshot copy 1102d of the table 1102b for bandwidth usage may be obtained and updated. Continuing with reference to FIG. 11D, a failure to obtain the requested link bandwidth for a particular flow may be determined at spine switch 1104. For example, spine switch 1104 may determine that a link to address 3.3.3.3. having 3 Gbps is unavailable. Here, the spine switch 1104 may send a response packet which indicates the failure back to leaf switch 1108. Receipt of the response packet indicating a failure may cause an attempt of one or more alternative approaches or paths in a subsequent batch query.

Figure 11F:
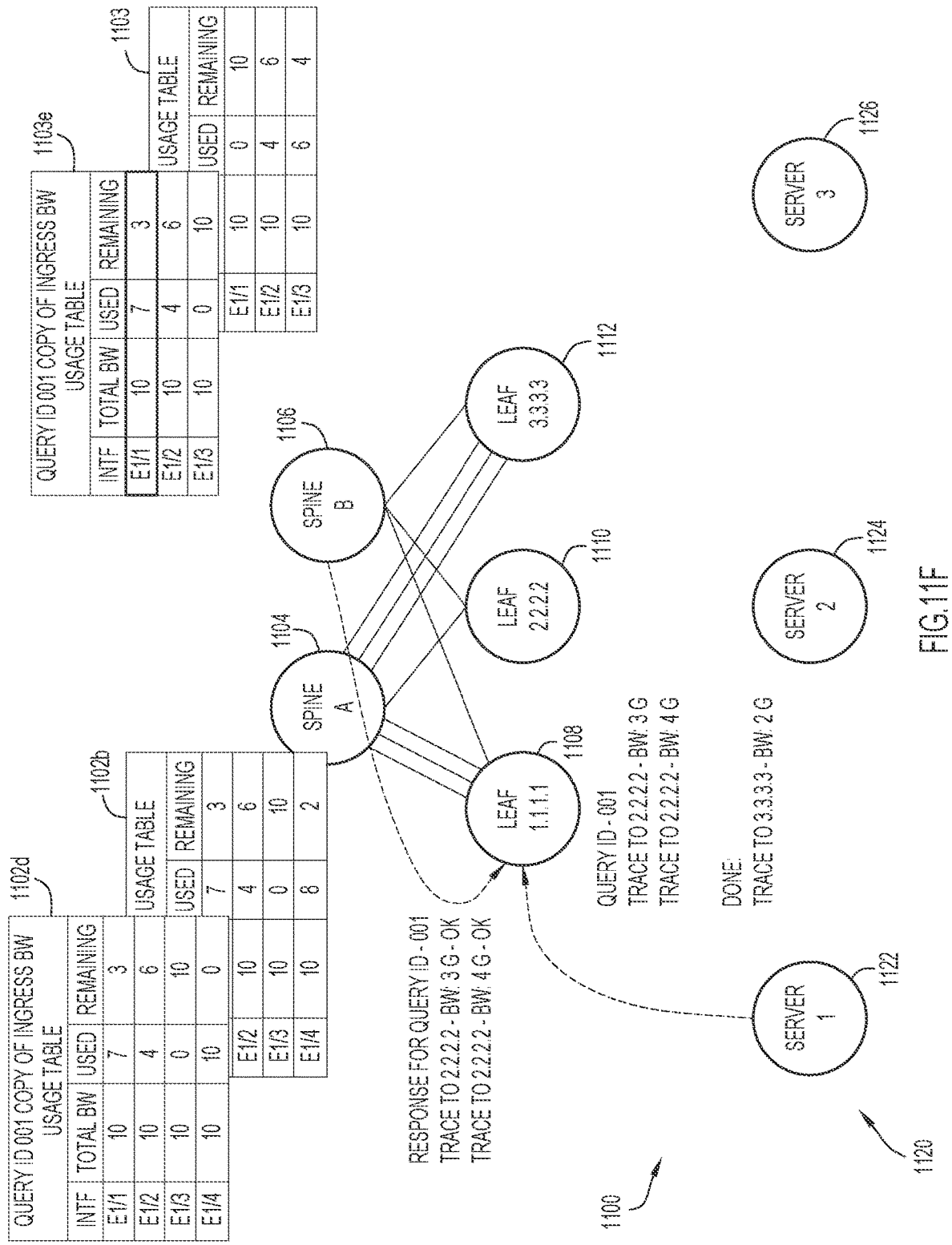
Figure 11G:
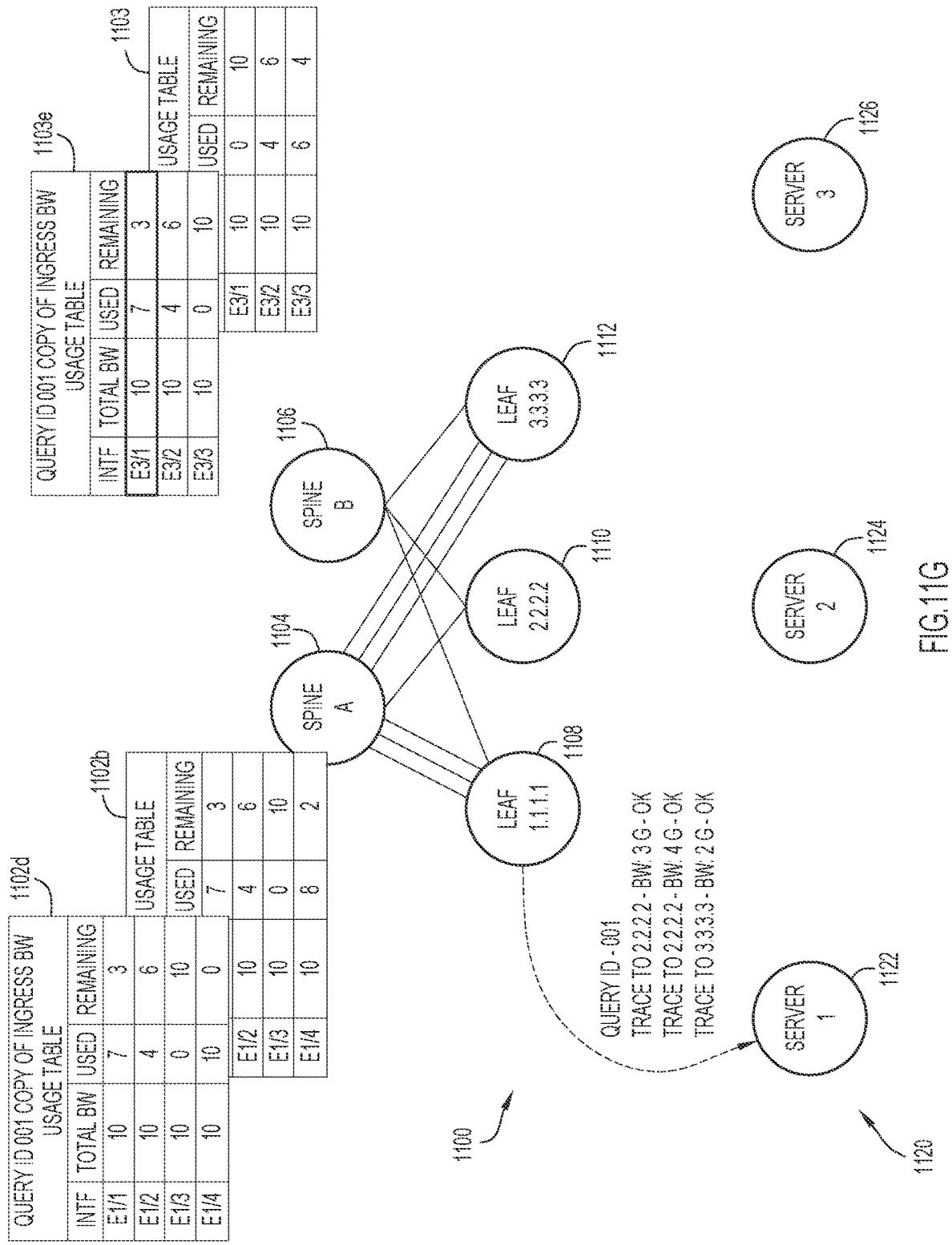

With reference now to FIG. 11E, it is illustrated that, upon receiving a response packet indicating the failure, leaf switch 1108 may look for viable alternative paths; for example, leaf switch 1108 may send the batch query to spine switch 1106 to identify a viable alternative path. Here, spine switch 1106 may take a snapshot copy 1103e of an existing table 1103 for bandwidth usage. In this example, this alternative path is determined to satisfy the requested link for the multicast group. With reference to FIG. 11F, spine switch 1106 may send to leaf switch 1108 a response packet which includes such an indication, perhaps with the further indication that the alternative path may be able to service the other two multicast groups. In FIG. 11G, it is illustrated that the alternative path is indeed acceptable for all of the multicast groups (i.e. all requested link bandwidths are satisfied). Accordingly, host receivers may be instantiated on server 1122, and the batch of IP multicast flows may then be established.

Figure 11H:
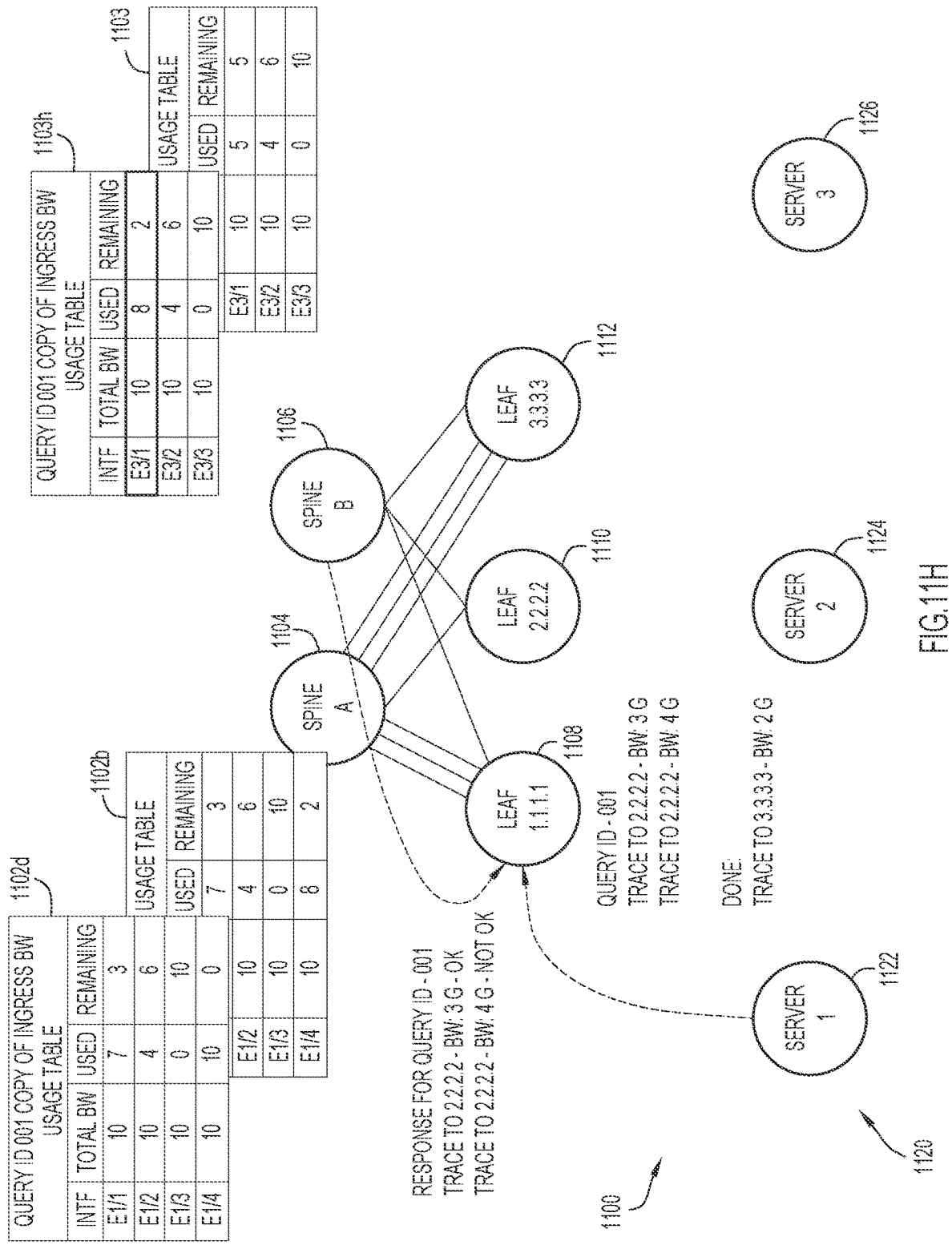
Figure 11I:
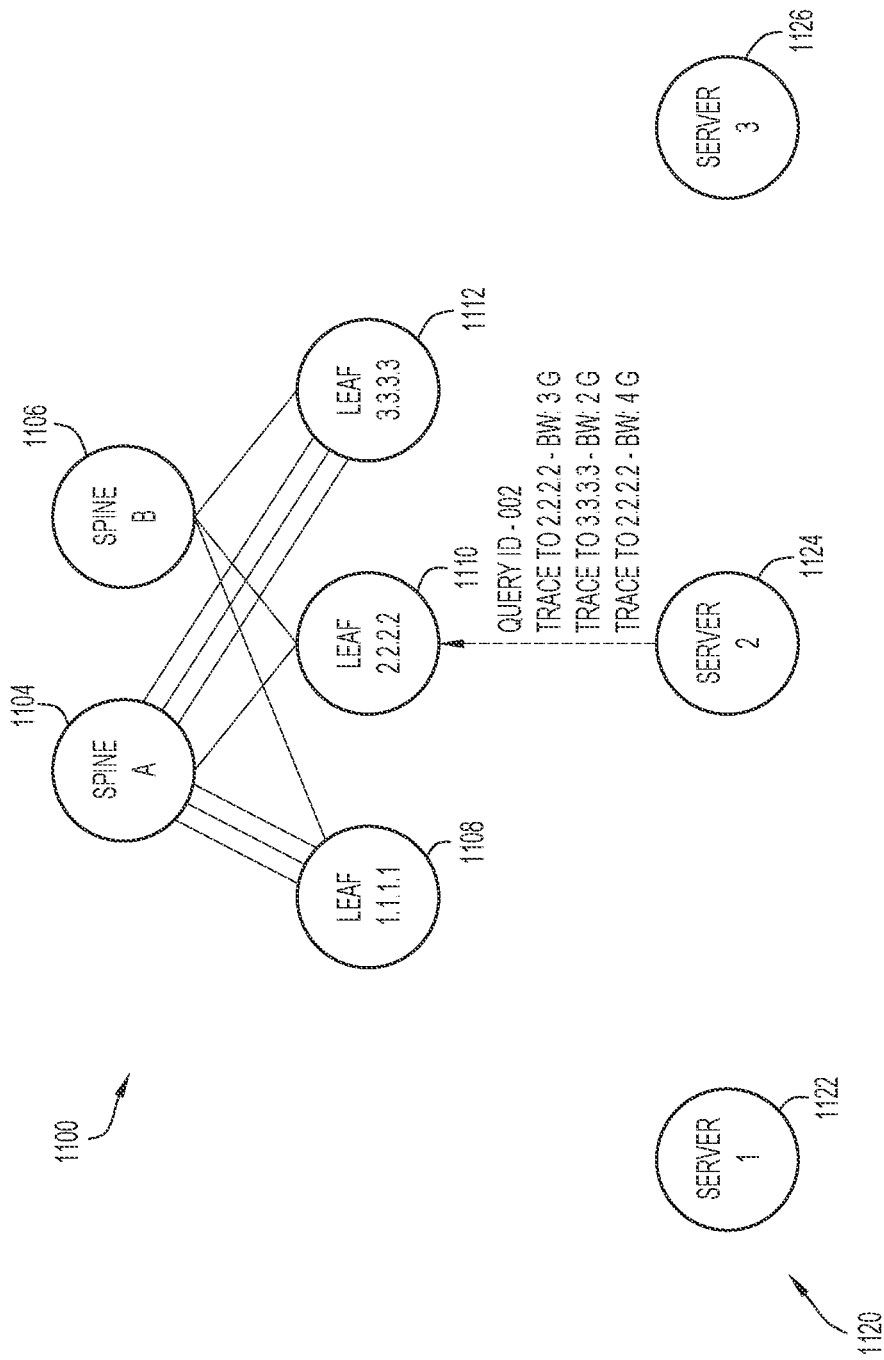

With reference now to FIG. 11H, it may be possible that spine switch 1106 was unable to accommodate all of the requests as it did in relation to FIG. 11E (i.e. all requested link bandwidths may not be satisfied). With respect to FIG. 11I, a user may want to select an alternate server (i.e. server 1124) and submit the batch query from there. Here, server 1124 may send to leaf switch 1110 the multicast traceroute batch query packet for the batch query. Here, the batch query is associated with Query ID=002 and indicates the same batch of multicast traceroute queries (e.g. 3 total) which include a trace to address 2.2.2.2 with a requested link bandwidth of 3 Gbps, a trace to address 3.3.3.3 with a requested link bandwidth of 2 Gbps, and a trace to address 2.2.2.2 with a requested link bandwidth of 4 Gbps.

Figure 11J:
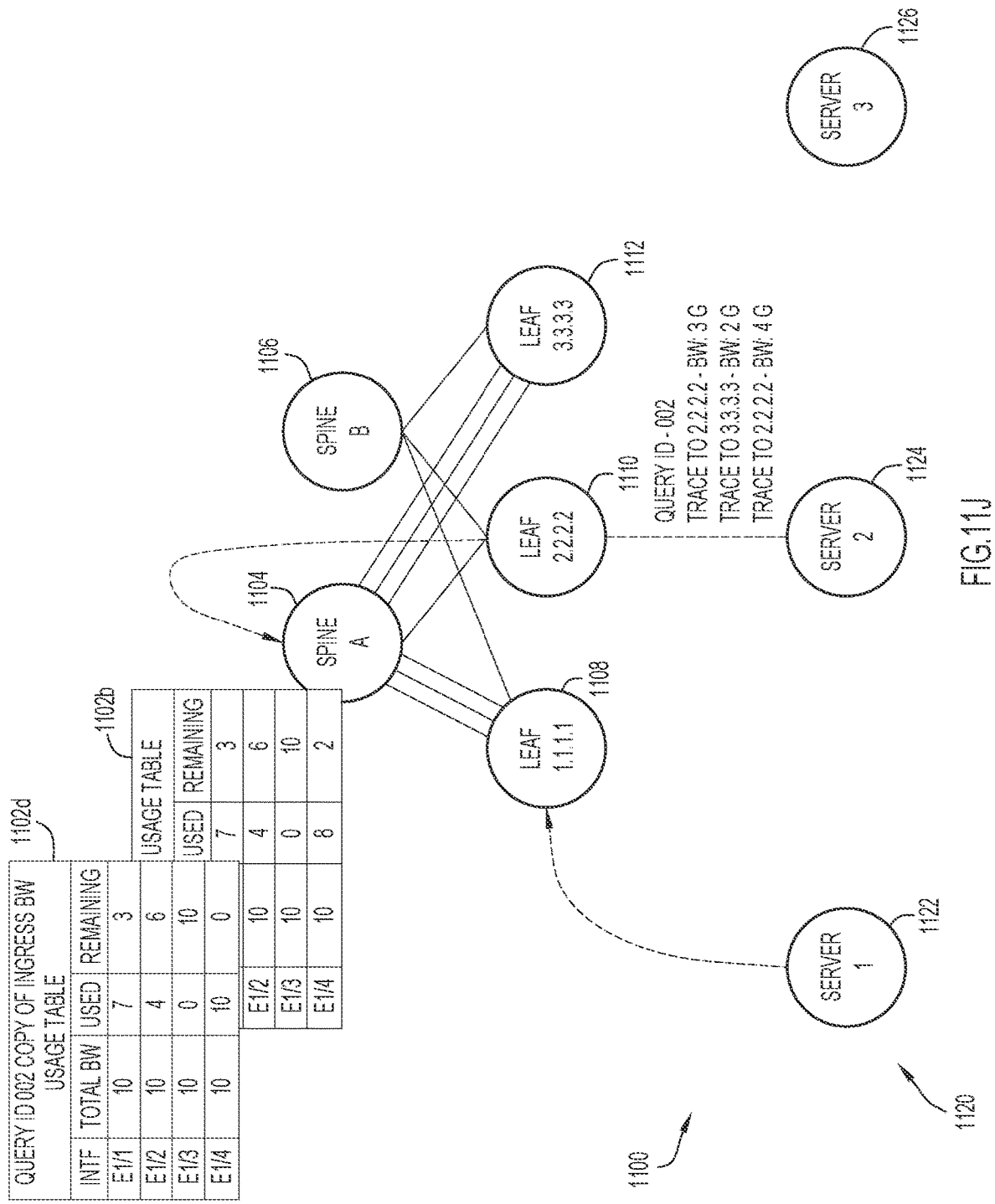
Figure 11K:
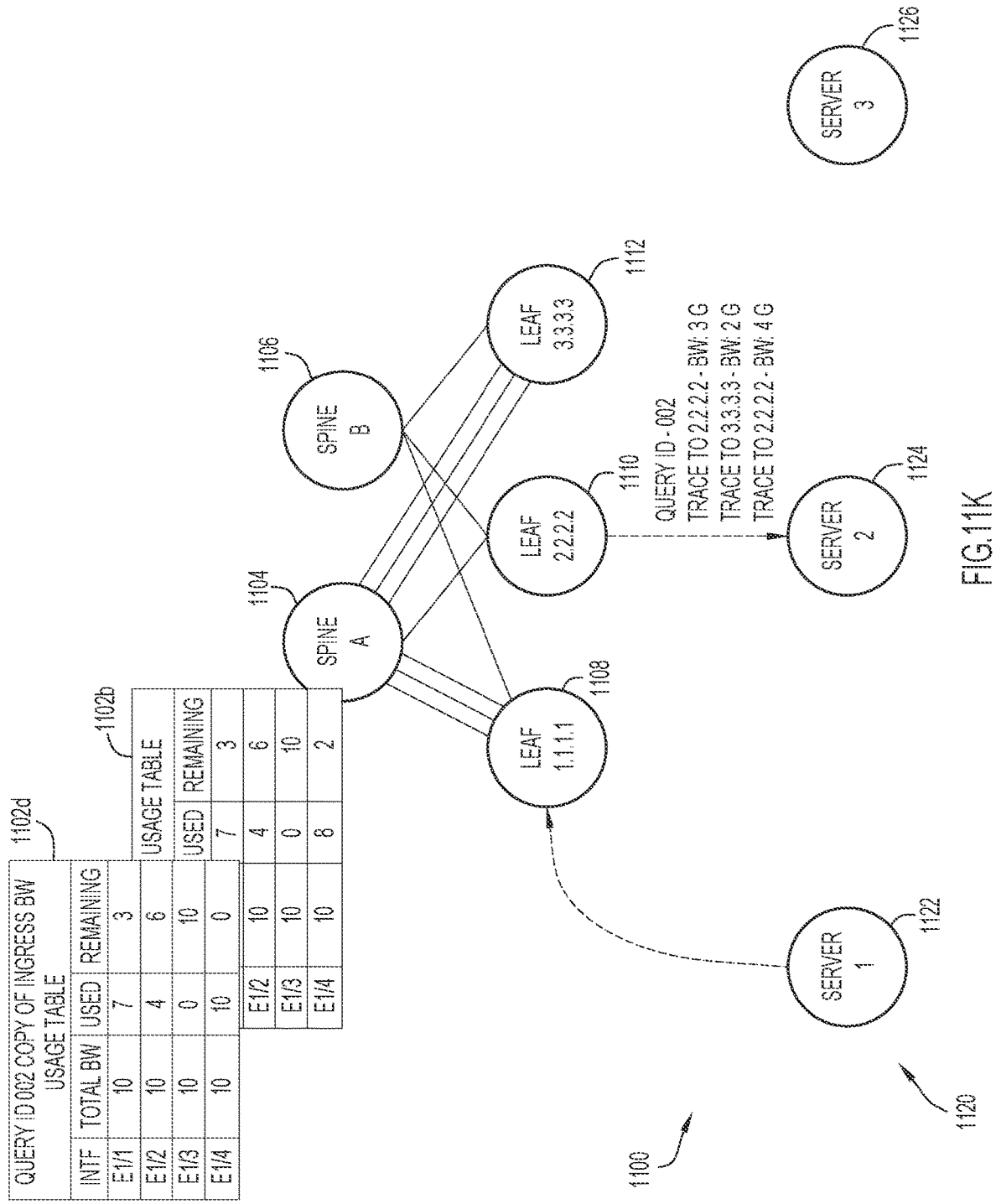

With reference now to FIG. 11J, it is illustrated that leaf switch 1100 may determine its previous-hop router node as spine switch 1104 and therefore forward on the corresponding traceroute request to spine switch 1104. Accordingly, with reference to FIG. 11K, leaf switch 1110 may send a traceroute response packet back to server 1124. Host receivers may then be instantiated on server 1124, and the batch of IP multicast flows may then be established.

Figure 11L:
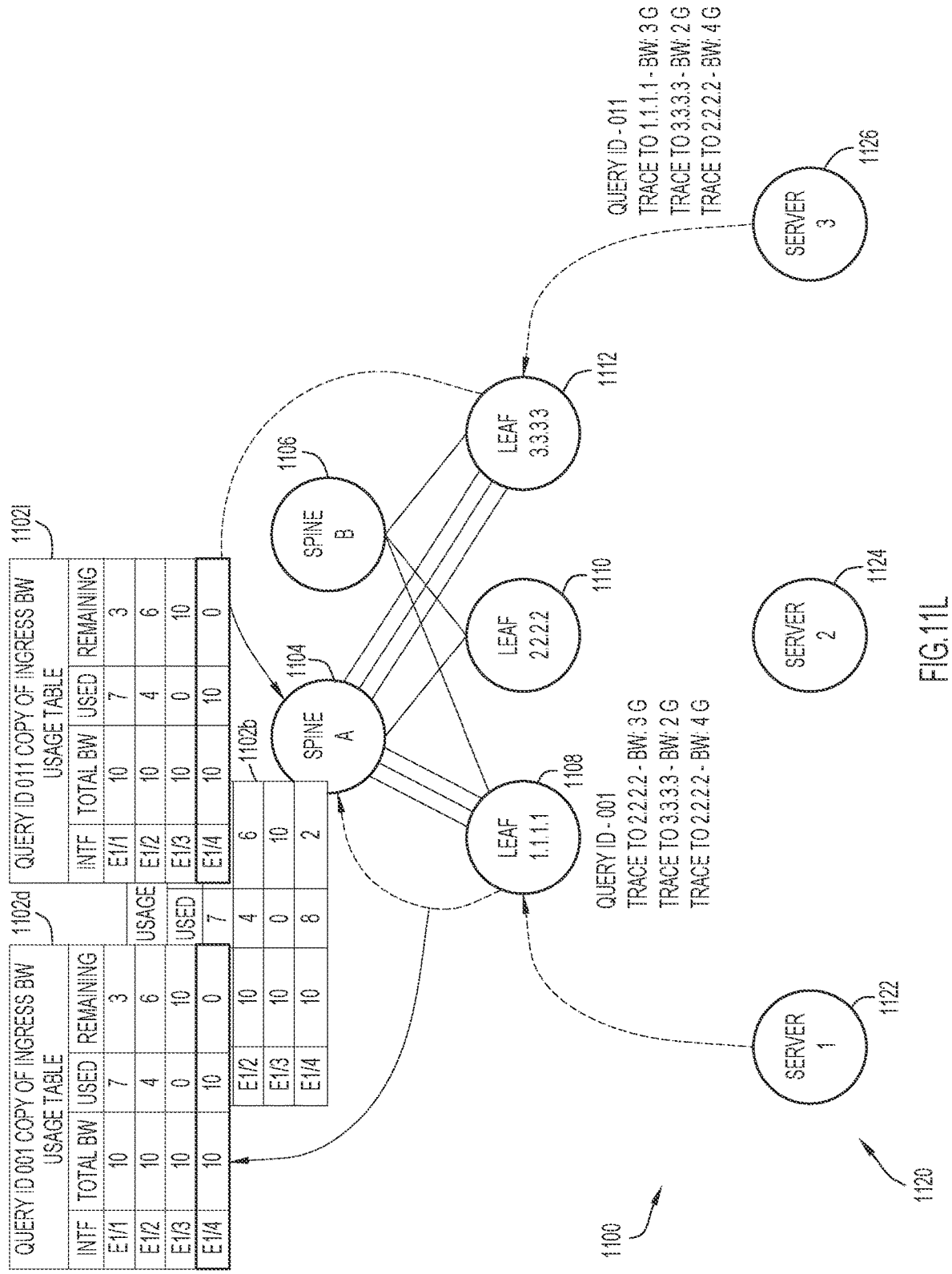

With respect to FIG. 11L, in the event that the batch query associated with FIG. 11J failed, the user may make an adjustment to the batch query. For example, the batch query for the failed multicast groups may be sent from server 1126 or even split between servers. Here, spine switch 1104 may take a snapshot copy 1102l of its table for bandwidth usage. Since each switch may process the batch queries based on query ID, multiple batch queries may be submitted at the same time, as illustrated in FIG. 11L.

Figure 12:
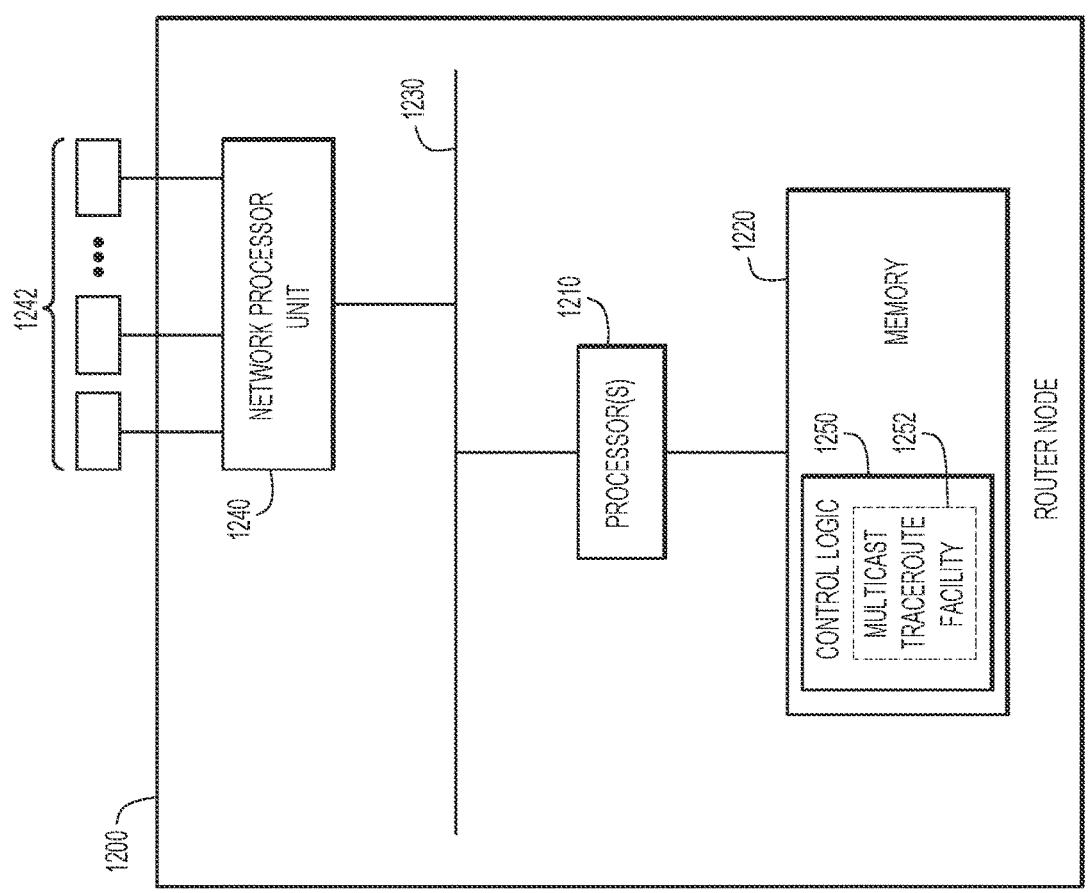
FIG. 12 illustrates a block diagram of a network node (e.g. a switch) configured to perform operations according to some implementations as described herein.

FIG. 12 illustrates a block diagram of a router node 1200 (e.g. a router or switch) configured to perform operations described above according to some implementations. The network node 1200 includes one or more processors 1210 for control, memory 1220, a bus 1230 and a network processor unit 1240. The processor 1210 may be a microprocessor or microcontroller. The network processor unit 1240 may include one or more Application Specific Integrated Circuits (ASICs), line cards, etc., and facilitates network communications between the router node 1200 and other network nodes.

There are a plurality of network ports 1242 at which the router node 1200 receives packets and from which router node 1200 sends packets into the network. The processor 1210 executes instructions associated with software stored in memory 1220. Specifically, the memory 1220 stores instructions for control logic 1250 that, when executed by the processor 1210, causes the processor 1210 to perform various operations on behalf of router node 1200 as described herein. The memory 1220 may also store a multicast traceroute facility 1252 for batch query processing according to some implementations of the present disclosure. It should be noted that in some embodiments, the control logic 1250 may be implemented in the form of firmware implemented by one or more ASICs as part of the network processor unit 1240.

The memory 1220 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1220 may comprise one or more tangible (non-transitory) computer readable storage media (e.g., a memory device) encoded with software comprising computer executable instructions and when the software is executed (by the processor 1210) it is operable to perform certain network node operations described herein.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first router node could be termed a second router node, and similarly, a second router node could be termed a first router node, without changing the meaning of the description, so long as all occurrences of the "first router node" are renamed consistently and all occurrences of the "second router node" are renamed consistently. The first router node and the second router node are both router nodes, but they are not the same router node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   providing a multicast traceroute facility for a plurality of interconnected router nodes which are configured to communicate Internet Protocol (IPJ multicast traffic amongst hosts, the multicast traceroute facility being for use in processing a multicast traceroute batch query packet which indicates a batch of multicast traceroute queries of a batch query for initiating multicast tracing to identify a plurality of traced paths as indicated in a plurality of traceroute responses to the batch query, each traced path of the plurality of traced paths being associated with one or more links each having a link metric that is identified to satisfy a requested link metric; and
   causing a batch of IP multicast traffic flows to be established via at least some of the interconnected router nodes according to the plurality of traced paths identified from the processing of the multicast traceroute batch query packet of the batch query.

2. The method of claim 1, wherein the requested link metric comprises a requested link bandwidth.

3. The method of claim 2, wherein processing associated with the multicast traceroute batch query packet causes resources that satisfy the requested link bandwidth in the at least some of the interconnected router nodes to be reserved for a predetermined or specified time period.

4. The method of claim 1, wherein the multicast traceroute facility is provided for the plurality of interconnected router nodes which comprise a plurality of interconnected switches of an IP network media data router.

5. A method comprising:
   providing a multicast traceroute facility for a plurality of interconnected router nodes which are configured to communicate Internet Protocol (IP) multicast traffic amongst hosts, the multicast traceroute facility being for use in processing a multicast traceroute batch query packet which indicates a batch of multicast traceroute queries of a batch query for identifying a plurality of traced paths for a batch of IP multicast traffic flows, each multicast traceroute query of the batch query being associated with a plurality of data fields which indicate a multicast group address, a source address, a destination address, and a requested link metric;
   wherein processing associated with the multicast traceroute batch query packet results in generation of one or more corresponding request or response packets which indicate a plurality of traceroute responses to the batch of multicast traceroute queries of the batch query, each traceroute response including a list of one or more response blocks which defines a corresponding one of the traced paths for a corresponding one of the IP multicast traffic flows, each response block of a traceroute response including:
a previous-hop router address of a previous-hop router node from which IP multicast traffic is expected from a source node that is associated with at least one of the source address and the multicast group address; and
an incoming interface address of an incoming interface of the previous-hop router node from which the IP multicast traffic is expected from the source node, the incoming interface being associated with a link having a link metric that is identified to satisfy the requested link metric of the multicast traceroute query.

6. The method of claim 5, wherein the requested link metric comprises a requested link bandwidth.

7. The method of claim 6, wherein processing associated with the multicast traceroute batch query packet causes, for each link of a traced path, resources that satisfy the requested link bandwidth in the at least some of the interconnected router nodes to be reserved for a predetermined or specified time period.

8. The method of claim 5, wherein the multicast traceroute facility is provided for the plurality of interconnected router nodes which comprise a plurality of interconnected switches of an IP network media data router.

9. The method of claim 5, further comprising:
causing the batch of IP multicast traffic flows to be established via at least some of the interconnected router nodes according to the plurality of traced paths identified from the processing of the multicast traceroute batch query packet of the batch query.

10. The method of claim 5, wherein each interconnected router node includes a plurality of interfaces and is configured to, for each one of the plurality of interfaces, track a link metric of a link associated with the interface.

11. The method of claim 5, wherein the multicast traceroute batch query packet includes a data field which indicates a query ID associated with the batch query.

12. The method of claim 5, wherein each interconnected router node includes a plurality of interfaces and is configured to, for each one of the plurality of interfaces, track a link metric of a link associated the interface, and further configured to:
receive the multicast traceroute batch query packet or a corresponding request packet thereof;
for each one of at least some of the multicast traceroute queries indicated in the multicast traceroute batch query packet or corresponding request packet thereof:
determine the previous-hop router address and the incoming interface address of the incoming interface associated with a link that has a link metric that satisfies the requested link metric of the multicast traceroute query; and
insert the previous-hop router address and the incoming interface address in a corresponding one of the response blocks for a corresponding one of the traceroute responses.

13. A router node comprising:
one or more processors;
a plurality of interfaces configured to connect with a plurality of interconnected router nodes to facilitate communication of Internet Protocol (IP) multicast traffic amongst hosts;
the one or more processors being configured to, for each one of the plurality of interfaces, track a link metric of a link associated with the interface;
the one or more processors being further configured to execute a multicast traceroute facility, including:
receiving a multicast traceroute batch query packet, or a corresponding request packet thereof, which indicates a batch of multicast traceroute queries of a batch query for use in identifying a plurality of traced paths for a batch of IP multicast traffic flows, each multicast traceroute query of the batch query being associated with a plurality of data fields which indicate a multicast group address, a source address, a destination address, and a requested link metric;
for each one of at least some of the multicast traceroute queries of the batch query:
determining a previous-hop router address of a previous-hop router node from which IP multicast traffic is expected from a source node that is associated with at least one of the source address and the multicast group address of the multicast traceroute query; and
determining an incoming interface address of an incoming interface of the previous-hop router node from which the IP multicast traffic is expected from the source node, the incoming interface being associated with a link that has a link metric that satisfies the requested link metric of the multicast traceroute query.

14. The router node of claim 13, wherein processing associated with the multicast traceroute batch query packet, or corresponding request packet thereof, results in generation of one or more corresponding request or response packets which indicate a plurality of traceroute responses to the batch of multicast traceroute queries of the batch query, each traceroute response including a list of one or more response blocks which defines a corresponding one of the traced paths for a corresponding one of the IP multicast traffic flows.

15. The router node of claim 14, which is configured to execute the multicast traceroute facility further including:
for each one of at least some of the multicast traceroute queries of the batch query:
insert the previous-hop router address and the incoming interface address in a corresponding one of the response blocks for a corresponding one of the traceroute responses.

16. The router node of claim 13, which is configured to execute the multicast traceroute facility further including:
reserving resources for satisfying the requested link metric for the incoming interface associated with the link.

17. The router node of claim 15, configured to execute the multicast traceroute facility, further including:
sending to the previous-hop router the corresponding request packet which includes the plurality of traceroute responses to the batch of multicast traceroute queries of the batch query; or
sending, to a network node associated with a response address indicated in the multicast traceroute batch query packet, the one or more corresponding response packets which indicate the plurality of traceroute responses to the batch of multicast traceroute queries of the batch query.

18. The router node of claim 15, configured to execute the multicast traceroute facility, further including:
splitting the multicast traceroute batch query packet or corresponding request packet thereof by:
generating and sending a first corresponding request packet to a first previous-hop router from which IP multicast traffic is expected from a first source node that is associated with at least one of a first source address and a first multicast group address of a first multicast traceroute query; and generating and sending a second corresponding request packet to a second previous-hop router from which IP multicast traffic is expected from a second source node that is associated with at least one of a second source address and a second multicast group address of a second multicast traceroute query.

19. The router node of claim 15, configured to execute the multicast traceroute facility, further including:

for any one of at least some of the multicast traceroute queries of the batch query:

failing to determine a previous-hop router address of a previous-hop router node from which IP multicast traffic is expected from the source node that is associated with at least one of the source address and the multicast group address of the multicast traceroute query, or failing to determine an incoming interface address of the previous-hop router node where the incoming interface address is of an incoming interface associated with a link that has a link metric that satisfies the requested link metric of the multicast traceroute query; and in response to the failing to determine, generating and sending a response packet which indicates a failure.

20. The router node of claim 13, further comprising:

wherein the requested link metric comprises a requested link bandwidth, and wherein resources for satisfying the requested link bandwidth for each link of each traced path are reserved for a predetermined or specified time period.

* * * * *

UNITED STATES PATENT AND TRADEMARK OFFICE
CERTIFICATE OF CORRECTION

PATENT NO. : 11,245,618 B2
APPLICATION NO. : 16/392974
DATED : February 8, 2022
INVENTOR(S) : Rishi Chhibber et al.

It is certified that error appears in the above-identified patent and that said Letters Patent is hereby corrected as shown below:

In the Claims

Claim 1, Column 22, Line 24, please replace "Protocol (IPJ" with --Protocol (IP)--

Signed and Sealed this
Twenty-fifth Day of October, 2022

Katherine Kelly Vidal
*Director of the United States Patent and Trademark Office*